US00RE50749E

(19) United States
(12) Reissued Patent
Moriya et al.

(10) Patent Number: US RE50,749 E
(45) Date of Reissued Patent: *Jan. 13, 2026

(54) CODING DEVICE, DECODING DEVICE, AND METHOD AND PROGRAM THEREOF

(71) Applicant: Nippon Telegraph and Telephone Corporation, Tokyo (JP)

(72) Inventors: Takehiro Moriya, Atsugi (JP); Yutaka Kamamoto, Atsugi (JP); Noboru Harada, Atsugi (JP)

(73) Assignee: Nippon Telegraph and Telephone Corporation, Tokyo (JP)

( * ) Notice: This patent is subject to a terminal disclaimer.

(21) Appl. No.: 17/969,329

(22) Filed: Oct. 19, 2022

Related U.S. Patent Documents

Reissue of:
(64) Patent No.: 10,811,021
Issued: Oct. 20, 2020
Appl. No.: 16/691,764
Filed: Nov. 22, 2019

U.S. Applications:
(63) Continuation of application No. 16/429,387, filed on Jun. 3, 2019, now Pat. No. 10,553,229, which is a
(Continued)

(30) Foreign Application Priority Data

May 1, 2014 (JP) ..... 2014-094759

(51) Int. Cl.
*G10L 19/00* (2013.01)
*G10L 19/032* (2013.01)
(Continued)

(52) U.S. Cl.
CPC ..... *G10L 19/07* (2013.01); *G10L 19/032* (2013.01); *G10L 19/038* (2013.01); *G10L 19/06* (2013.01);
(Continued)

(58) Field of Classification Search
CPC ..... G10L 19/07; G10L 19/032; G10L 19/06; G10L 19/24; G10L 2019/0016; G10L 19/038
See application file for complete search history.

(56) References Cited

U.S. PATENT DOCUMENTS 5,642,465 A * 6/1997 Scott ..... G10L 19/038 704/E19.017
5,787,391 A * 7/1998 Moriya ..... G10L 19/07 704/224
(Continued)

FOREIGN PATENT DOCUMENTS

EM 1 179 820 A2 2/2002
EP 1 179 820 A2 2/2002

OTHER PUBLICATIONS

International Search Report issued Apr. 14, 2015, in PCT/JP2015/057728 filed Mar. 16. 2015.
(Continued)

*Primary Examiner* — Nick Corsaro
(74) *Attorney, Agent, or Firm* — Oblon, McClelland, Maier & Neustadt, L.L.P.

(57) ABSTRACT

A technology of accurately coding and decoding coefficients which are convertible into linear prediction coefficients even for a frame in which the spectrum variation is great while suppressing an increase in the code amount as a whole is provided. A coding device includes: a first coding unit that obtains a first code by coding coefficients which are convertible into linear prediction coefficients of more than one order; and a second coding unit that obtains a second code by coding at least quantization errors of the first coding unit if (A–1) an index Q commensurate with how high the peak-to-valley height of a spectral envelope is, the spectral envelope corresponding to the coefficients which are convertible into the linear prediction coefficients of more than
(Continued)

one order, is larger than or equal to a predetermined threshold value Th1 and/or (B−1) an index Q' commensurate with how short the peak-to-valley height of the spectral envelope is, is smaller than or equal to a predetermined threshold value Th1'.

12 Claims, 14 Drawing Sheets

Related U.S. Application Data continuation of application No. 16/044,678, filed on Jul. 25, 2018, now Pat. No. 10,381,015, which is a continuation of application No. 15/306,622, filed as application No. PCT/JP2015/057728 on Mar. 16, 2015, now Pat. No. 10,074,376.

(51) Int. Cl.
*G10L 19/038* (2013.01)
*G10L 19/06* (2013.01)
*G10L 19/07* (2013.01)
*G10L 19/24* (2013.01)

(52) U.S. Cl.
CPC ..... *G10L 2019/0016* (2013.01); *G10L 19/24* (2013.01)

(56) References Cited

U.S. PATENT DOCUMENTS 5,797,119 A * 8/1998 Ozawa ..... G10L 19/0018 704/223
5,802,487 A * 9/1998 Tanaka ..... G10L 19/07 704/E19.025
5,893,060 A * 4/1999 Honkanen ..... G10L 19/09 704/E19.024
5,953,698 A * 9/1999 Hayata ..... G10L 19/012 704/226
5,987,406 A * 11/1999 Honkanen ..... G10L 19/06 704/223
6,098,883 A * 8/2000 Zocca ..... G06K 7/14 235/462.25
6,377,915 B1 * 4/2002 Sasaki ..... G10L 19/04 704/206
6,460,036 B1 * 10/2002 Herz ..... G06Q 30/02 707/748
6,871,106 B1 * 3/2005 Ishikawa ..... G10L 19/0212 704/E19.02
7,167,828 B2 * 1/2007 Ehara ..... G10L 19/18 704/E19.041
8,543,389 B2 * 9/2013 Ragot ..... G10L 19/0204 704/200.1
9,093,068 B2 * 7/2015 Jeong ..... G10L 19/22
9,111,525 B1 * 8/2015 Mouchtaris ..... G10L 19/008
10,529,350 B2 * 1/2020 Moriya ..... G10L 19/032
2002/0038210 A1 3/2002 Yajima et al.
2002/0164014 A1 * 11/2002 Givens ..... H04B 3/23 379/406.06
2004/0101048 A1 * 5/2004 Paris ..... G10L 19/008 704/E19.023
2005/0021201 A1 * 1/2005 Klotz ..... B60W 30/16 702/189
2007/0211924 A1 * 9/2007 Hamza ..... G06K 9/0061 382/117
2007/0223577 A1 * 9/2007 Ehara ..... G10L 19/07 375/240.03
2008/0126082 A1 * 5/2008 Ehara ..... G10L 19/24 704/205
2010/0049522 A1 * 2/2010 Tamura ..... G10L 13/033 704/264
2012/0022864 A1 * 1/2012 Leman ..... G10L 25/00 704/233
2015/0187366 A1 * 7/2015 Moriya ..... H03M 7/3059 704/206

OTHER PUBLICATIONS

ITU-T, G.729, Telecommunication Standardization Sector of ITU, General Aspects of Digital Transmission Systems: Coding of Speech at 8 kbit/s Using Conjugate-Structure Algebraic-Code-Excited Linear-Prediction (CS-ACELP), I03-96), 38 paaes.
Extended Search Report issued Sep. 8, 2017 in European Patent Application No. 15785337.5.
Dong-ii Chang, et al., "Efficient Quantization of LSF Parameters using Classified SVQ Combined with Conditional Splitting", XP10625338A, International conference on acoustics, speech, and signal processing, vol. 1, May 1995, 4 pages.
Office Action issued Sep. 19, 2017 in Korean Patent Application No. 10-2016-7030343 (with English language translation).
ITU-T, G.729, Telecommunication Standardization Sector of ITU, General Aspects of Digital Transmission Systems: Coding of Speech at 8 kbit/s Using Conjugate-Structure Algebraic-Code-Excited Linear-Prediction (CS-ACELP), (Mar. 1996), 38 pages.
ITU-T Recommendation G.718. "Frame error robust narrow-band and wideband embedded variable bit-rate coding of speech and audio from 8-32 kbit/s" ITU-T, 2008, 255 pages.

* cited by examiner

CODING DEVICE, DECODING DEVICE, AND METHOD AND PROGRAM THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

*The present application is a reissue of application Ser. No. 16/691,764 filed Nov. 22, 2019, now U.S. Pat. No. 10,811,021.*

This application is continuation of and claims the benefit of priority under 35 U.S.C. § 120 from U.S. application Ser. No. 16/429,387 filed Jun. 3, 2019, which is a continuation of U.S. application Ser. No. 16/044,678 filed Jul. 25, 2018 (now U.S. Pat. No. 10,381,015 issued Aug. 13, 2019), which is a continuation of U.S. application Ser. No. 15/306,622 filed Oct. 25, 2016 (now U.S. Pat. No. 10,074,376 issued Sep. 11, 2018), the entire contents of which are incorporated herein by reference. U.S. application Ser. No. 15/306,622 is a National Stage of PCT/JP2015/057728 filed Mar. 16, 2015, which claims the benefit of priority from Japanese Application No. 2014-094759 filed May 1, 2014.

TECHNICAL FIELD

The present invention relates to a coding technology and a decoding technology of coding and decoding linear prediction coefficients and coefficients which are convertible thereinto.

BACKGROUND ART

In coding of sound signals such as speech and music, a method of performing the coding by using linear prediction coefficients obtained by performing linear prediction analysis on an input sound signal is widely used.

In order to make it possible to obtain, on the part of a decoding device, the information on the linear prediction coefficients used in coding processing by decoding, a coding device codes the linear prediction coefficients and sends a code corresponding to the linear prediction coefficients to the decoding device. In Non-patent Literature 1, a coding device converts linear prediction coefficients into a sequence of LSP (Line Spectrum Pair) parameters which are parameters in a frequency domain and equivalent to the linear prediction coefficients and sends an LSP code obtained by coding the sequence of LSP parameters to a decoding device.

The outline of existing sound signal coding device 60 and decoding device 70 which are provided with linear prediction coefficient coding device and decoding device, respectively, will be described.

<Existing Coding Device 60>

The configuration of the existing coding device 60 is depicted in FIG. 1.

The coding device 60 includes a linear prediction analysis unit 61, an LSP calculation unit 62, an LSP coding unit 63, a coefficient conversion unit 64, a linear prediction analysis filter unit 65, and a residual coding unit 66. Of these units, the LSP coding unit 63 that receives LSP parameters, codes the LSP parameters, and outputs an LSP code is a linear prediction coefficient coding device.

To the coding device 60, frame-by-frame, which is a predetermined time segment, input sound signals are consecutively input, and the following processing is performed on a frame-by-frame basis. Hereinafter, specific processing of each unit will be described on the assumption that an input sound signal which is being currently processed is an fth frame. An input sound signal of an fth frame is referred to as $X_f$.

<Linear Prediction Analysis Unit 61>

The linear prediction analysis unit 61 receives an input sound signal $X_f$, obtains linear prediction coefficients $a_f[1], a_f[2], \ldots, a_f[p]$ (p is a prediction order) by performing linear prediction analysis on the input sound signal $X_f$, and outputs the linear prediction coefficients $a_f[1], a_f[2], \ldots, a_f[p]$. Here, $a_f[i]$ represents an ith-order linear prediction coefficient that is obtained by performing linear prediction analysis on the input sound signal $X_f$ of the fth frame.

<LSP Calculation Unit 62>

The LSP calculation unit 62 receives the linear prediction coefficients $a_f[1], a_f[2], \ldots, a_f[p]$, obtains LSP (Line Spectrum Pairs) parameters $\theta_f[1], \theta_f[2], \ldots, \theta_f[p]$ from the linear prediction coefficients $a_f[1], a_f[2], \ldots, a_f[p]$, and outputs the LSP parameters $\theta_f[1], \theta_f[2], \ldots, \theta_f[p]$. Here, $\theta_f[i]$ is an ith-order LSP parameter corresponding to the input sound signal $X_f$ of the fth frame.

<LSP Coding Unit 63>

The LSP coding unit 63 receives the LSP parameters $\theta_f[1], \theta_f[2], \ldots, \theta_f[p]$, codes the LSP parameters $\theta_f[1], \theta_f[2], \ldots, \theta_f[p]$, obtains an LSP code $CL_f$ and quantization LSP parameters $\hat{\theta}_f[1], \hat{\theta}_f[2], \ldots, \hat{\theta}_f[p]$ corresponding to the LSP code, and outputs the LSP code $CL_f$ and the quantization LSP parameters $\hat{\theta}_f[1], \hat{\theta}_f[2], \ldots, \hat{\theta}_f[p]$. Incidentally, the quantization LSP parameters are what are obtained by quantizing the LSP parameters. In Non-patent Literature 1, coding is performed by a method by which a weighted differential vector of the LSP parameters $\theta_f[1], \theta_f[2], \ldots, \theta_f[p]$ based on a past frame is obtained, the weighted differential vector is divided into two subvectors: one on a low-order side and the other on a high-order side, and coding is performed such that each subvector becomes the sum of subvectors from two codebooks; however, there are various existing technologies as the coding method. Therefore, in coding of the LSP parameters, various well-known coding methods are sometimes adopted, such as the method described in Non-patent Literature 1, a method of performing vector quantization in multiple stages, a method of performing scalar quantization, and a method obtained by combining these methods.

<Coefficient Conversion Unit 64>

The coefficient conversion unit 64 receives the quantization LSP parameters $\hat{\theta}_f[1], \hat{\theta}_f[2], \ldots, \hat{\theta}_f[p]$, obtains linear prediction coefficients from the quantization LSP parameters $\hat{\theta}_f[1], \hat{\theta}_f[2], \ldots, \hat{\theta}_f[p]$, and outputs the linear prediction coefficients. Incidentally, since the output linear prediction coefficients correspond to quantized LSP parameters, the output linear prediction coefficients are referred to as quantization linear prediction coefficients. Here, the quantization linear prediction coefficients are assumed to be $\hat{a}_f[1], \hat{a}_f[2], \ldots, \hat{a}_f[p]$.

<Linear Prediction Analysis Filter Unit 65>

The linear prediction analysis filter unit 65 receives the input sound signal $X_f$ and the quantization linear prediction coefficients $\hat{a}_f[1], \hat{a}_f[2], \ldots, \hat{a}_f[p]$, obtains a linear prediction residual signal which is a linear prediction residue by the quantization linear prediction coefficients $\hat{a}_f[1]$, $\hat{a}_f[2], \ldots, \hat{a}_f[p]$ of the input sound signal $X_f$, and outputs the linear prediction residual signal.

<Residual Coding Unit 66>

The residual coding unit 66 receives the linear prediction residual signal, obtains a residual code $CR_f$ by coding the linear prediction residual signal, and outputs the residual code $CR_f$.

<Existing Decoding Device 70>

The configuration of the existing decoding device 70 is depicted in FIG. 2. To the decoding device 70, frame-by-frame LSP codes $CL_f$ and residual codes $CR_f$ are input, and the decoding device 70 obtains a decoded sound signal $\hat{X}_f$ by performing decoding processing on a frame-by-frame basis.

The decoding device 70 includes a residual decoding unit 71, an LSP decoding unit 72, a coefficient conversion unit 73, and a linear prediction synthesis filter unit 74. Of these units, the LSP decoding unit 72 that receives an LSP code, decodes the LSP code, obtains decoded LSP parameters, and outputs the decoded LSP parameters is a linear prediction coefficient decoding device.

Hereinafter, specific processing of each unit will be described on the assumption that an LSP code and a residual code on which decoding processing is being currently performed are an LSP code $CL_f$ and a residual code $CR_f$, respectively, corresponding to an fth frame.

<Residual Decoding Unit 71>

The residual decoding unit 71 receives the residual code $CR_f$, obtains a decoded linear prediction residual signal by decoding the residual code $CR_f$, and outputs the decoded linear prediction residual signal.

<LSP Decoding Unit 72>

The LSP decoding unit 72 receives the LSP code $CL_f$, obtains decoded LSP parameters $\hat{\theta}_f[1], \theta_f[2], \ldots, \hat{\theta}_f[p]$ by decoding the LSP code $CL_f$, and outputs the decoded LSP parameters $\hat{\theta}_f[1], \hat{\theta}_f[2], \ldots, \hat{\theta}_f[p]$. If the LSP code $CL_f$ output from the coding device 60 is input to the decoding device 70 without error, the decoded LSP parameters obtained in the LSP decoding unit 72 are the same as the quantization LSP parameters obtained in the LSP coding unit 63 of the coding device 60.

<Coefficient Conversion Unit 73>

The coefficient conversion unit 73 receives the decoded LSP parameters $\hat{\theta}_f[1], \hat{\theta}_f[2], \ldots, \hat{\theta}_f[p]$, converts the decoded LSP parameters $\hat{\theta}_f[1], \hat{\theta}_f[2], \ldots, \hat{\theta}_f[p]$ into linear prediction coefficients, and outputs the linear prediction coefficients. Since the output linear prediction coefficients correspond to LSP parameters obtained by decoding, the output linear prediction coefficients are referred to as decoded linear prediction coefficients and represented as $\hat{a}_f[1], \hat{a}_f[2], \ldots, \hat{a}_f[p]$.

<Linear Prediction Synthesis Filter Unit 74>

The linear prediction synthesis filter unit 74 receives the decoded linear prediction coefficients $\hat{a}_f[1], \hat{a}_f[2], \ldots, \hat{a}_f[p]$ and the decoded linear prediction residual signal, generates a decoded sound signal $\hat{X}_f$ by performing linear prediction synthesis on the decoded linear prediction residual signal by using the decoded linear prediction coefficients $\hat{a}_f[1], \hat{a}_f[2], \ldots, \hat{a}_f[p]$, and outputs the decoded sound signal $\hat{X}_f$.

PRIOR ART LITERATURE

Non-Patent Literature

Non-patent Literature 1: "ITU-T Recommendation G.729", ITU, 1996

SUMMARY OF THE INVENTION

Problems to be Solved by the Invention

In the existing technology, LSP parameters are coded by the same coding method in all the frames. As a result, if the spectrum variation is great, coding cannot be performed accurately to such an extent that coding is performed when the spectrum variation is small.

An object of the present invention is to provide a technology of accurately coding and decoding coefficients which are convertible into linear prediction coefficients also in a frame in which the variation in a spectrum is great while suppressing an increase in the code amount as a whole.

Means to Solve the Problems

In order to solve the above-described problem, according to one aspect of the present invention, a coding device includes: a first coding unit that obtains a first code by coding coefficients which are convertible into linear prediction coefficients of more than one order; and a second coding unit that obtains a second code by coding at least quantization errors of the first coding unit if (A–1) an index Q commensurate with how high the peak-to-valley height of a spectral envelope is, the spectral envelope corresponding to the coefficients which are convertible into the linear prediction coefficients of more than one order, is larger than or equal to a predetermined threshold value Th1 and/or (B–1) an index Q' commensurate with how short the peak-to-valley height of the spectral envelope is, is smaller than or equal to a predetermined threshold value Th1'.

In order to solve the above-described problem, according to another aspect of the present invention, a decoding device includes: a first decoding unit that obtains first decoded values by decoding a first code, the first decoded values corresponding to coefficients which are convertible into linear prediction coefficients of more than one order; a second decoding unit that obtains second decoded values of more than one order by decoding a second code if (A) an index Q commensurate with how high the peak-to-valley height of a spectral envelope is, the spectral envelope corresponding to the first decoded values of the coefficients which are convertible into the linear prediction coefficients of more than one order, is larger than or equal to a predetermined threshold value Th1 and/or (B) an index Q' commensurate with how short the peak-to-valley height of the spectral envelope is, is smaller than or equal to a predetermined threshold value Th1'; and an addition unit that obtains third decoded values corresponding to the coefficients which are convertible into the linear prediction coefficients of more than one order by adding the first decoded values and the second decoded values of corresponding orders if (A) the index Q commensurate with how high the peak-to-valley height of the spectral envelope is, the spectral envelope corresponding to the first decoded values of the coefficients which are convertible into the linear prediction coefficients of more than one order, is larger than or equal to the predetermined threshold value Th1 and/or (B) the index Q' commensurate with how short the peak-to-valley height of the spectral envelope is, is smaller than or equal to the predetermined threshold value Th1'.

In order to solve the above-described problem, according to another aspect of the present invention, a coding method includes: a first coding step in which a first coding unit obtains a first code by coding coefficients which are convertible into linear prediction coefficients of more than one order; and a second coding step in which a second coding unit obtains a second code by coding at least quantization errors of the first coding unit if (A−1) an index Q commensurate with how high the peak-to-valley height of a spectral envelope is, the spectral envelope corresponding to the coefficients which are convertible into the linear prediction coefficients of more than one order, is larger than or equal to a predetermined threshold value Th1 and/or (B−1) an index Q' commensurate with how short the peak-to-valley height of the spectral envelope is, is smaller than or equal to a predetermined threshold value Th1'.

In order to solve the above-described problem, according to another aspect of the present invention, a decoding method includes: a first decoding step in which a first decoding unit obtains first decoded values by decoding a first code, the first decoded values corresponding to coefficients which are convertible into linear prediction coefficients of more than one order; a second decoding step in which a second decoding unit obtains second decoded values of more than one order by decoding a second code if (A) an index Q commensurate with how high the peak-to-valley height of a spectral envelope is, the spectral envelope corresponding to the first decoded values of the coefficients which are convertible into the linear prediction coefficients of more than one order, is larger than or equal to a predetermined threshold value Th1 and/or (B) an index Q' commensurate with how short the peak-to-valley height of the spectral envelope is, is smaller than or equal to a predetermined threshold value Th1'; and an addition step of obtaining third decoded values corresponding to the coefficients which are convertible into the linear prediction coefficients of more than one order by adding the first decoded values and the second decoded values of corresponding orders if (A) the index Q commensurate with how high the peak-to-valley height of the spectral envelope is, the spectral envelope corresponding to the first decoded values of the coefficients which are convertible into the linear prediction coefficients of more than one order, is larger than or equal to the predetermined threshold value Th1 and/or (B) the index Q' commensurate with how short the peak-to-valley height of the spectral envelope is, is smaller than or equal to the predetermined threshold value Th1'.

Effects of the Invention

The present invention produces the effect of being able to accurately code and decode coefficients which are convertible into linear prediction coefficients even for a frame in which the spectrum variation is great while suppressing an increase in the code amount as a whole.

DETAILED DESCRIPTION OF THE EMBODIMENTS

Figure 1:
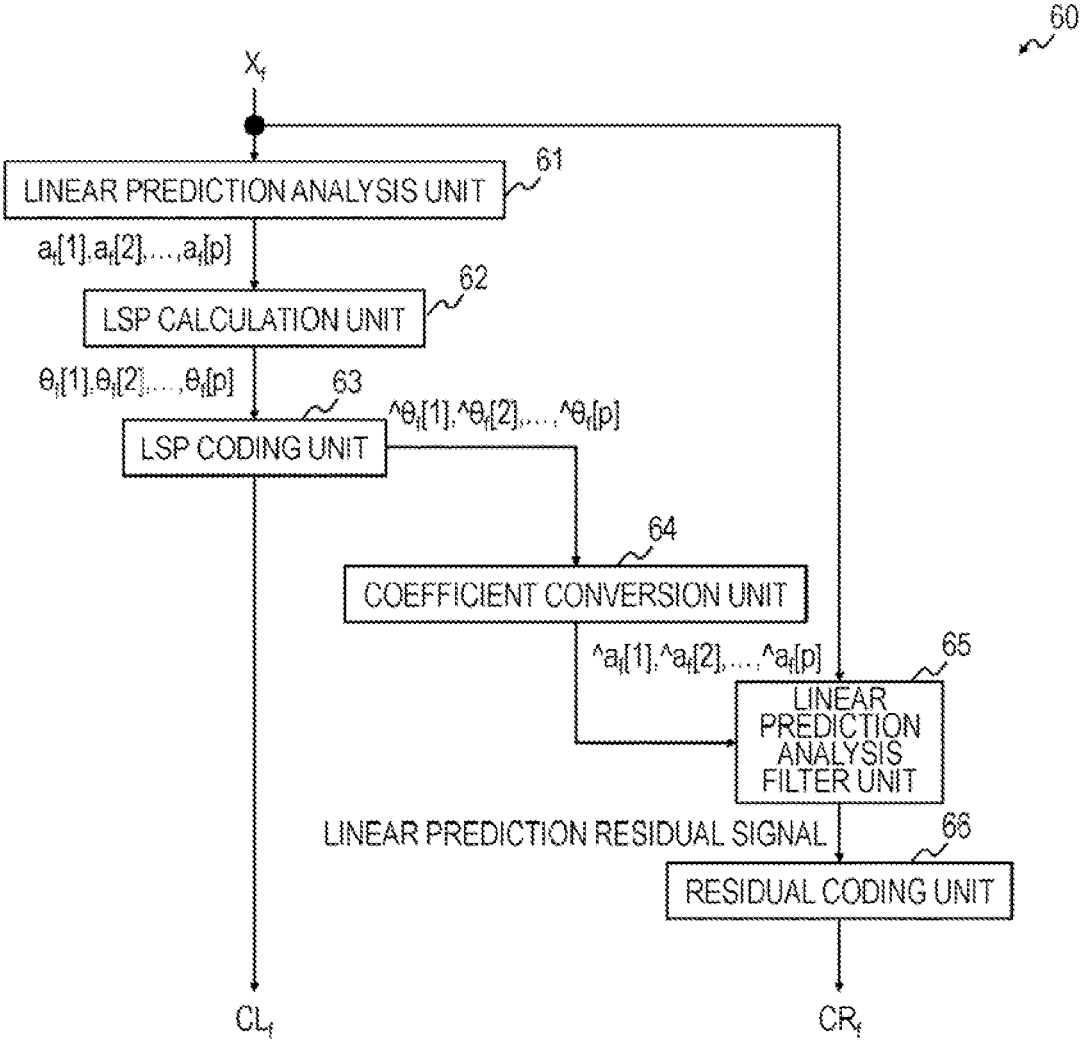
PRIOR ART FIG. 1
FIG. 1 is a diagram depicting the configuration of an existing coding device.
Figure 2:
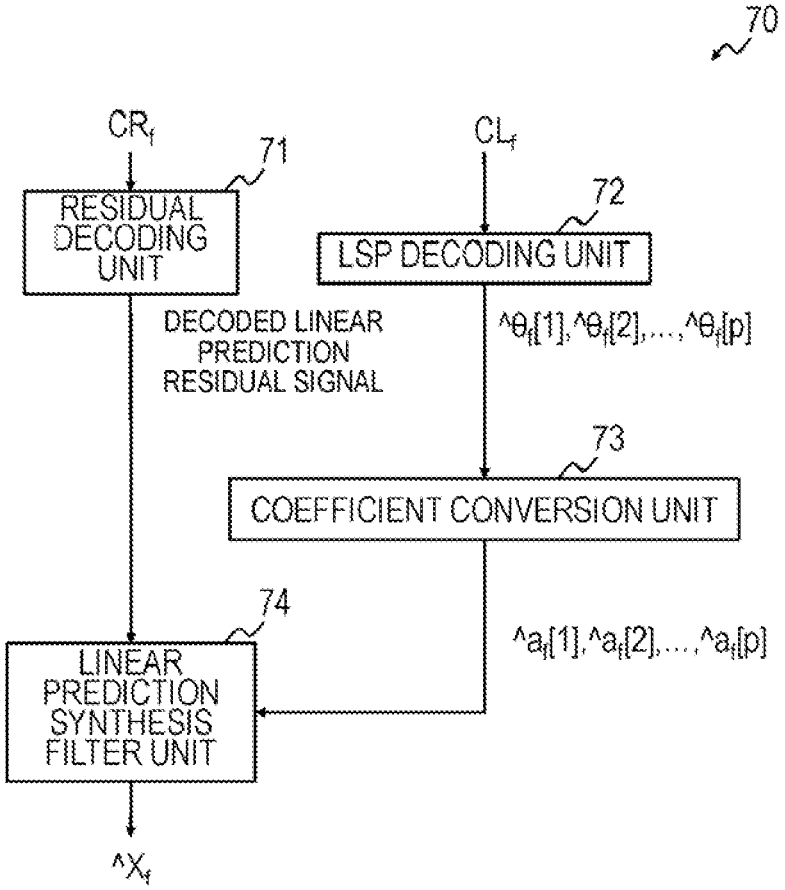
PRIOR ART FIG. 2
FIG. 2 is a diagram depicting the configuration of an existing decoding device.

Hereinafter, embodiments of the present invention will be described. Incidentally, in the drawings which are used in the following description, component elements having the same function and steps in which the same processing is performed are identified with the same characters and overlapping explanations will be omitted. In the following description, symbols such as "^", "~", and "—" used in this text are supposed to be written immediately above letters immediately following these symbols, but, due to a restriction imposed by text notation, they are written immediately before the letters. In formulae, these symbols are written in their proper positions. Moreover, it is assumed that processing which is performed for each element of the elements of a vector and a matrix is applied to all the elements of the vector and the matrix unless otherwise specified.

First Embodiment

Hereinafter, differences from the existing example will be mainly described.

<Coding Device 100 According to the First Embodiment>

Figure 3:
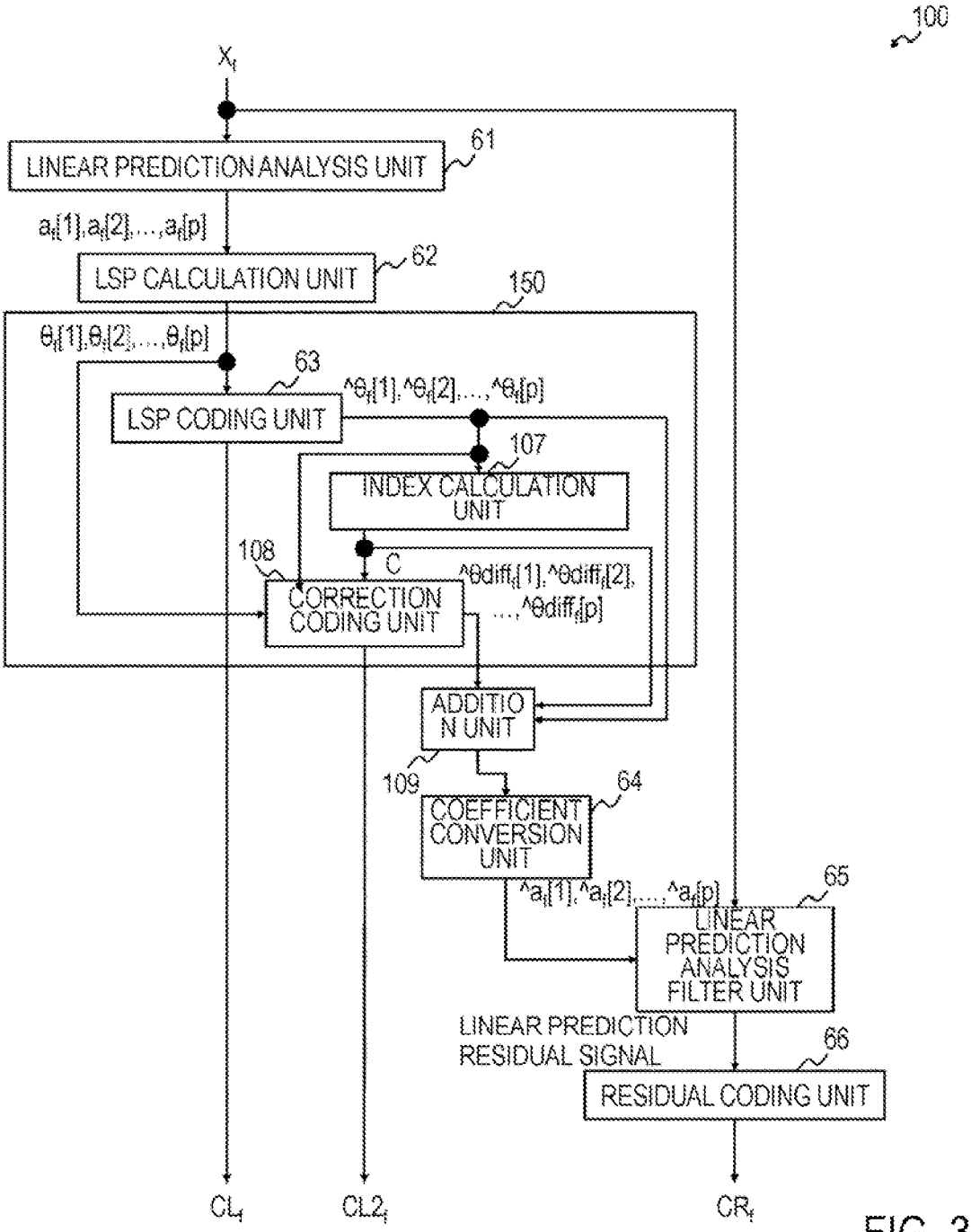
FIG. 3 is a functional block diagram of a coding device according to a first embodiment.
Figure 4:
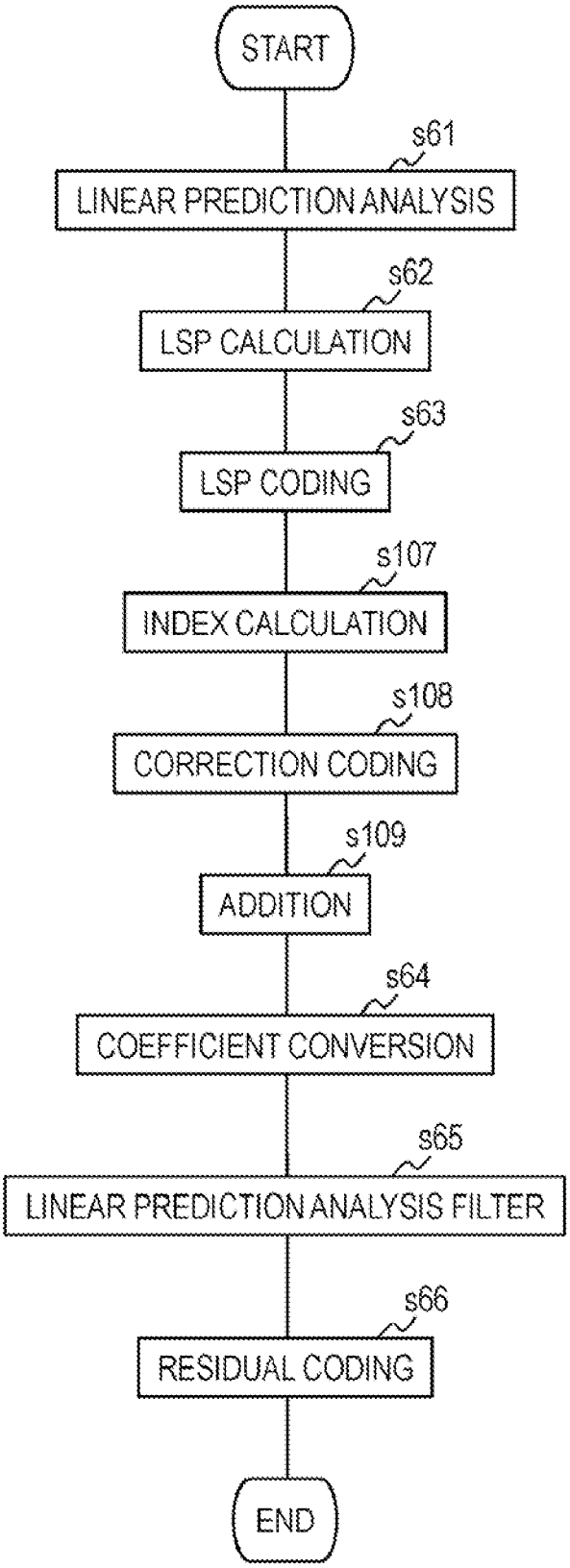
FIG. 4 is a diagram depicting an example of the processing flow of the coding device according to the first embodiment.

FIG. 3 depicts a functional block diagram of a sound signal coding device 100 including a linear prediction coefficient coding device according to the first embodiment, and FIG. 4 depicts an example of the processing flow thereof.

The coding device 100 includes a linear prediction analysis unit 61, an LSP calculation unit 62, an LSP coding unit 63, a coefficient conversion unit 64, a linear prediction analysis filter unit 65, and a residual coding unit 66, and further includes an index calculation unit 107, a correction coding unit 108, and an addition unit 109. Of these units, a portion that receives LSP parameters, codes the LSP parameters, and outputs an LSP code $CL_f$ and a correction LSP code $CL2_f$, that is, the portion including the LSP coding unit 63, the index calculation unit 107, and the correction coding unit 108 is a linear prediction coefficient coding device 150.

The processing which is performed in the linear prediction analysis unit 61, the LSP calculation unit 62, the LSP coding unit 63, the coefficient conversion unit 64, the linear prediction analysis filter unit 65, and the residual coding unit 66 is the same as that described in the existing technology and corresponds to s61 to s66, respectively, of FIG. 4.

The coding device 100 receives a sound signal $X_f$ and obtains an LSP code $CL_f$, a correction code $CL2_f$, and a residual code $CR_f$.

<Index Calculation Unit 107>

The index calculation unit 107 receives the quantization LSP parameters $\hat{\theta}_f[1], \hat{\theta}_f[2], \ldots, \hat{\theta}_f[p]$ and calculates, by using the quantization LSP parameters $\hat{\theta}_f[1], \hat{\theta}_f[2], \ldots, \hat{\theta}_f[p]$, an index Q commensurate with how great the variation in a spectrum is, that is, the index Q which increases with an increase in the peak-to-valley of a spectral envelope and/or an index Q' commensurate with how small the variation in the spectrum is, that is, the index Q' which decreases with an increase in the peak-to-valley of the spectral envelope (s107). In accordance with the magnitude of the index Q and/or Q', the index calculation unit 107 outputs a control signal C to the correction coding unit 108 such that the correction coding unit 108 performs coding processing or performs coding processing using a predetermined bit number. Moreover, in accordance with the magnitude of the index Q and/or Q', the index calculation unit 107 outputs the control signal C to the addition unit 109 such that the addition unit 109 performs addition processing.

In the present embodiment, a determination as to whether or not to code a sequence of quantization errors of the LSP coding unit 63, that is, differential values between the LSP parameters $\theta_f[1], \theta_f[2], \ldots, \theta_f[p]$ and the quantization LSP parameters $\hat{\theta}_f[1], \hat{\theta}_f[2], \ldots, \hat{\theta}_f[p]$ of corresponding orders is made by using the magnitude of the variation in a spectrum which is calculated from the quantization LSP parameters $\hat{\theta}_f[1], \hat{\theta}_f[2], \ldots, \hat{\theta}_f[p]$. The "magnitude of the variation in a spectrum" may also be called the "peak-to-valley height of a spectral envelope" or the "magnitude of a change in the height difference in the waves of the amplitude of a power spectral envelope".

Hereinafter, a method of generating the control signal C will be described.

In general, LSP parameters are a parameter sequence in a frequency domain having a correlation to a power spectral envelope of an input sound signal, and each value of the LSP parameters correlates with the frequency position of the extreme value of the power spectral envelope of the input sound signal. If the LSP parameters are assumed to be $\theta[1], \theta[2], \ldots, \theta[p]$, the extreme value of the power spectral envelope is present in the frequency position between $\theta[i]$ and $\theta[i+1]$, and, the steeper the slope of a tangent around this extreme value is, the narrower the interval (that is, the value of $(0[i+1]-\theta[i])$) between $0[i]$ and $0[i+1]$ becomes. That is, the larger the height difference in the waves of the amplitude of the power spectral envelope is, the more unequal the interval between $\theta[i]$ and $\theta[i+1]$ becomes for each i, that is, the higher the variance of the intervals between the LSP parameters becomes; conversely, if there is almost no height difference in the waves of the power spectral envelope, the more equal the interval between $\theta[i]$ and $\theta[i+1]$ becomes for each i.

Thus, a large index corresponding to the variance of the intervals between the LSP parameters means a large change in the height difference of the waves of the amplitude of a power spectral envelope. Moreover, a small index corresponding to the minimum value of the intervals between the LSP parameters means a large change in the height difference of the waves of the amplitude of a power spectral envelope.

Since the quantization LSP parameters $\hat{\theta}_f[1], \hat{\theta}_f[2], \ldots, \hat{\theta}_f[p]$ are what are obtained by quantizing the LSP parameters $\theta_f[1], \theta_f[2], \ldots, \theta_f[p]$ and, if the LSP code is input to a decoding device from the coding device without error, the decoded LSP parameters $\hat{\theta}_f[1], \hat{\theta}_f[2], \ldots, \hat{\theta}_f[p]$ are the same as the quantization LSP parameters $\hat{\theta}_f[1], \hat{\theta}_f[2], \ldots, \hat{\theta}_f[p]$, the quantization LSP parameters $\hat{\theta}_f[1], \hat{\theta}_f[2], \ldots, \hat{\theta}_f[p]$ and the decoded LSP parameters $\hat{\theta}_f[1], \hat{\theta}_f[2], \ldots, \hat{\theta}_f[p]$ also have the properties similar to those of the LSP parameters $\theta_f[1], \theta_f[2], \ldots, \theta_f[p]$.

Thus, a value corresponding to the variance of the intervals between the quantization LSP parameters $\hat{\theta}_f[1], \hat{\theta}_f[2], \ldots, \hat{\theta}_f[p]$ can be used as the index Q which increases with an increase in the peak-to-valley of a spectral envelope, and the minimum value of the differentials $(\hat{\theta}_f[i+1]-\hat{\theta}_f[i])$ between the quantization LSP parameters with adjacent (consecutive) orders, the quantization LSP parameters of the quantization LSP parameters $\hat{\theta}_f[1], \hat{\theta}_f[2], \ldots, \hat{\theta}_f[p]$, can be used as the index Q' which decreases with an increase in the peak-to-valley of a spectral envelope.

The index Q which increases with an increase in the peak-to-valley of a spectral envelope is calculated by, for example, an index Q indicating the variance of the intervals between the quantization LSP parameters $\hat{\theta}_f[1], \hat{\theta}_f[2], \ldots, \hat{\theta}_f[p]$, each having an order lower than or equal to a predetermined order T ($T \leq p$), that is, $$\bar{\theta} = \frac{1}{(T-1)} \sum_{i}^{T-1} \left(\hat{\theta}_f[i+1] - \hat{\theta}_f[i]\right)$$

$$Q = \frac{1}{(T-1)} \sum_{i}^{T-1} \left(\bar{\theta} - \hat{\theta}_f[i+1] - \hat{\theta}_f[i]\right)^2$$

Moreover, the index Q' which decreases with an increase in the peak-to-valley of a spectral envelope is calculated by, for example, an index Q' indicating the minimum value of the interval between the quantization LSP parameters with adjacent orders, the quantization LSP parameters of the quantization LSP parameters $\hat{\theta}_f[1], \hat{\theta}_f[2], \ldots, \hat{\theta}_f[p]$, each having an order lower than or equal to a predetermined order T ($T \leq p$), that is, $$Q' = \min_{i \in [1,\ldots,T-1]} \left(\hat{\theta}_f[i+1] - \hat{\theta}_f[i]\right)$$

or an index Q' indicating the minimum value of the interval between the quantization LSP parameters with adjacent orders, the quantization LSP parameters of the quantization LSP parameters $\hat{\theta}_f[1], \hat{\theta}_f[2], \ldots, \hat{\theta}_f[p]$, and the value of the lowest-order quantization LSP parameter, that is, $$Q' = \min_{i \in [1,\ldots,T-1]}\left(\min\left(\hat{\theta}_f[i+1] - \hat{\theta}_f[i]\right), \hat{\theta}_f[1]\right)$$

Since the LSP parameters are parameters present between 0 and $\pi$ in sequence of order, the lowest-order quantization LSP parameter $\hat{\theta}_f[1]$ in this formula means the interval $(\hat{\theta}_f[1]-0)$ between $\hat{\theta}_f[1]$ and 0.

The index calculation unit 107 outputs, to the correction coding unit 108 and the addition unit 109, the control signal C indicating that correction coding processing is performed if the peak-to-valley of the spectral envelope is above a predetermined standard, that is, in the above-described example, if (A−1) the index Q is larger than or equal to a predetermined threshold value Th1 and/or (B−1) the index Q' is smaller than or equal to a predetermined threshold value Th1'; otherwise, the index calculation unit 107 outputs, to the correction coding unit 108 and the addition unit 109, the control signal C indicating that correction coding processing is not performed. Here, "in the case of (A−1) and/or (B−1)" is an expression including the following three cases: a case in which only the index Q is obtained and the condition (A−1) is satisfied, a case in which only the index Q' is obtained and the condition (B−1) is satisfied, and a case in which both the index Q and the index Q' are obtained and the conditions (A−1) and (B−1) are satisfied. It goes without saying that, even when a determination as to whether or not the condition (A−1) is satisfied is made, the index Q' may be obtained, and, even when a determination as to whether or not the condition (B−1) is satisfied is made, the index Q may be obtained. The same goes for "and/or" in the following description.

Moreover, the index calculation unit 107 may be configured such that the index calculation unit 107 outputs a positive integer (or a code representing a positive integer) representing a predetermined bit number as the control signal C in the case of (A−1) and/or (B−1); otherwise, the index calculation unit 107 outputs 0 as the control signal C.

Incidentally, when the addition unit 109 is configured so as to perform addition processing if the addition unit 109 receives the control signal C and the correction coding unit 108 is configured so as to perform coding processing if the correction coding unit 108 receives the control signal C, the index calculation unit 107 may be configured so as not to output the control signal C in cases other than the case (A−1) and/or (B−1).

<Correction Coding Unit 108>

The correction coding unit 108 receives the control signal C, the LSP parameters $\theta_f[1], \theta_f[2], \ldots, \theta_f[p]$, and the quantization LSP parameters $\hat{\theta}_f[1], \hat{\theta}_f[2], \ldots, \hat{\theta}_f[p]$. If the correction coding unit 108 receives the control signal C indicating that correction coding processing is performed or a positive integer (or a code representing a positive integer) as the control signal C, in a word, if the peak-to-valley of the spectral envelope is above the predetermined standard, that is, in the above-described example, in the case of (A−1) and/or (B−1), the correction coding unit 108 obtains a correction LSP code $CL2_f$ by coding quantization errors of the LSP coding unit 63, that is, $\theta_f[1]-\hat{\theta}_f[1], \theta_f[2]-\hat{\theta}_f[2], \ldots, \theta_f[p]-\hat{\theta}_f[p]$ which are differentials between the LSP parameters $\theta_f[1], \theta_f[2], \ldots, \theta_f[p]$ and the quantization LSP parameters $\hat{\theta}_f[1], \hat{\theta}_f[2], \ldots, \hat{\theta}_f[p]$ of corresponding orders (s108) and outputs the correction LSP code $CL2_f$. Moreover, the correction coding unit 108 obtains quantization LSP parameter differential values $\hat{\theta}diff_f[1], \hat{\theta}diff_f[2], \ldots, \hat{\theta}diff_f[p]$ corresponding to the correction LSP code and outputs the quantization LSP parameter differential values $\hat{\theta}diff_f[1], \hat{\theta}diff_f[2], \ldots, \hat{\theta}diff_f[p]$. As a coding method, for example, well-known vector quantization simply has to be used.

For example, the correction coding unit 108 searches for a candidate correction vector closest to the differentials $\theta_f[1]-\hat{\theta}_f[1], \theta_f[2]-\hat{\theta}_f[2], \ldots, \theta_f[p]-\hat{\theta}_f[p]$ from a plurality of candidate correction vectors stored in an unillustrated correction vector codebook, and uses a correction vector code corresponding to the candidate correction vector as the correction LSP code $CL2_f$ and the candidate correction vector as the quantization LSP parameter differential values $\hat{\theta}diff_f[1], \hat{\theta}diff_f[2], \ldots, \hat{\theta}diff_f[p]$. Incidentally, the unillustrated correction vector codebook is stored in the coding device, and, in the correction vector codebook, candidate correction vectors and correction vector codes corresponding to the candidate correction vector are stored.

If the correction coding unit 108 receives the control signal C indicating that correction coding processing is not performed or 0 as the control signal C, in a word, if the peak-to-valley of the spectral envelope is not above the predetermined standard, that is, in the above-described example, in cases other than the case (A−1) and/or (B−1), the correction coding unit 108 does not perform coding of $\theta_f[1]-\hat{\theta}_f[1], \theta_f[2]-\hat{\theta}_f[2], \ldots, \theta_f[p]-\hat{\theta}_f[p]$ and does not output a correction LSP code $CL2_f$ and quantization LSP parameter differential values $\hat{\theta}diff_f[1], \hat{\theta}diff_f[2], \ldots, \hat{\theta}diff_f[p]$.

<Addition Unit 109>

The addition unit 109 receives the control signal C and the quantization LSP parameters $\hat{\theta}_f[1], \hat{\theta}_f[2], \ldots, \theta_f[p]$. Furthermore, if the addition unit 109 receives the control signal C indicating that correction coding processing is performed or a positive integer (or a code representing a positive integer) as the control signal C, in a word, if the peak-to-valley of the spectral envelope is above the predetermined standard, that is, in the above-described example, in the case of (A−1) and/or (B−1), the addition unit 109 also receives the quantization LSP parameter differential values $\hat{\theta}diff_f[1], \hat{\theta}diff_f[2], \ldots, \hat{\theta}diff_f[p]$.

If the addition unit 109 receives the control signal C indicating that correction coding processing is performed or a positive integer (or a code representing a positive integer) as the control signal C, in a word, if the peak-to-valley of the spectral envelope is above the predetermined standard, that is, in the above-described example, in the case of (A−1) and/or (B−1), the addition unit 109 outputs $\hat{\theta}_f[1]+\hat{\theta}diff_f[1], \hat{\theta}_f[2]+\hat{\theta}diff_f[2], \ldots, \hat{\theta}_f[p]+\hat{\theta}diff_f[p]$ obtained by adding the quantization LSP parameters $\hat{\theta}_f[1], \hat{\theta}_f[2], \ldots, \hat{\theta}_f[p]$ and the quantization LSP parameter differential values $\hat{\theta}diff_f[1], \hat{\theta}diff_f[2], \ldots, \hat{\theta}diff_f[p]$ (s109) as quantization LSP parameters $\hat{\theta}_f[1], \hat{\theta}_f[2], \ldots, \hat{\theta}_f[p]$ which are used in the coefficient conversion unit 64.

If the addition unit 109 receives the control signal C indicating that correction coding processing is not performed or 0 as the control signal C, in a word, if the peak-to-valley of the spectral envelope is not above the predetermined standard, that is, in the above-described example, in cases other than the case (A−1) and/or (B−1), the addition unit 109 outputs the received quantization LSP parameters $\hat{}_f[1], \hat{\theta}_f[2], \ldots, \hat{\theta}_f[p]$ to the coefficient conversion unit 64 without change. As a result, the quantization LSP parameters $\hat{\theta}_f[1], \hat{\theta}_f[2], \ldots, \hat{\theta}_f[p]$ of orders which are output from the LSP coding unit 63 become the quantization LSP parameters without change which are used in the coefficient conversion unit 64.

<Decoding Device 200 According to the First Embodiment>

Hereinafter, differences from the existing example will be mainly described.

Figure 5:
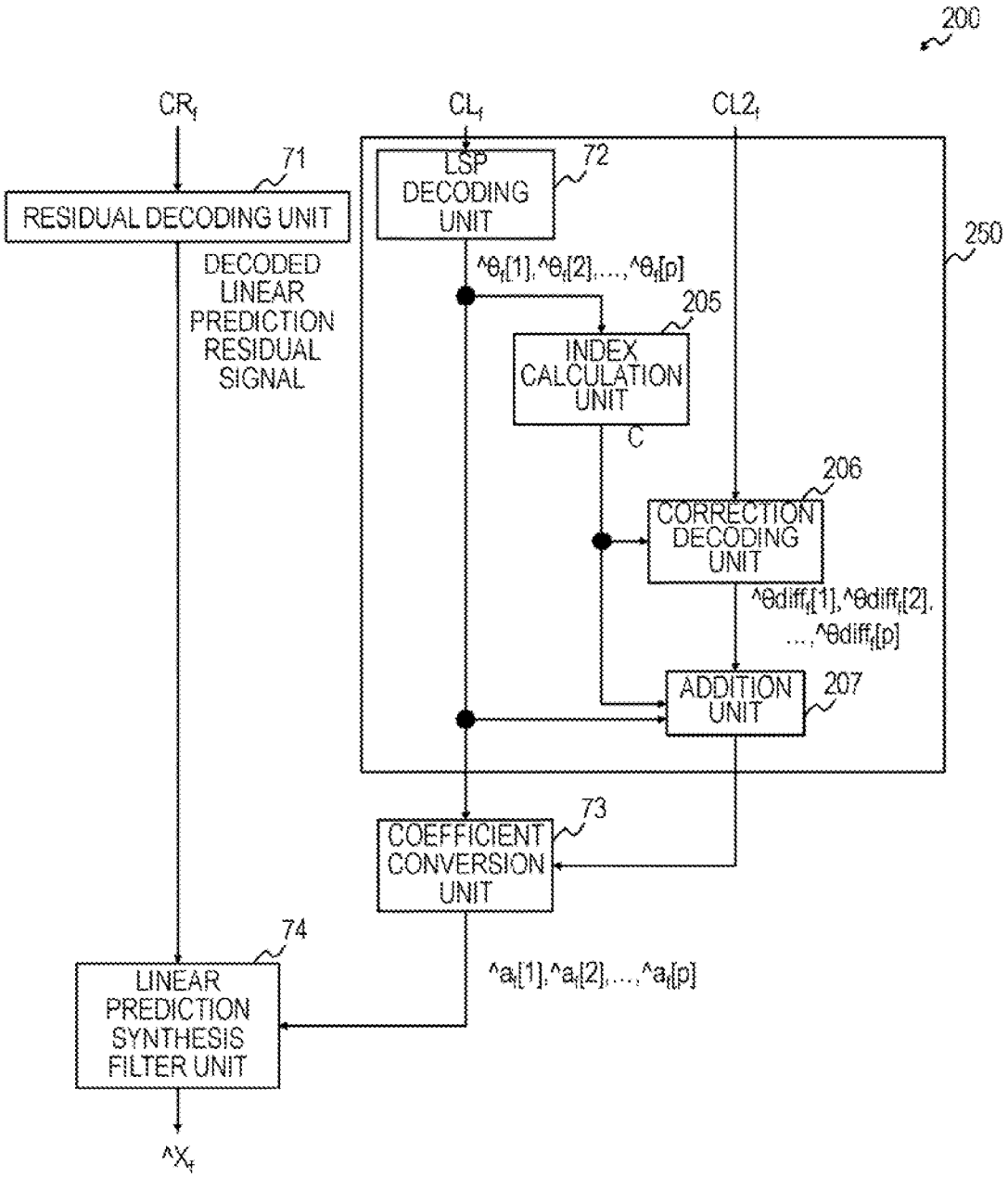
FIG. 5 is a functional block diagram of a decoding device according to the first embodiment.
Figure 6:
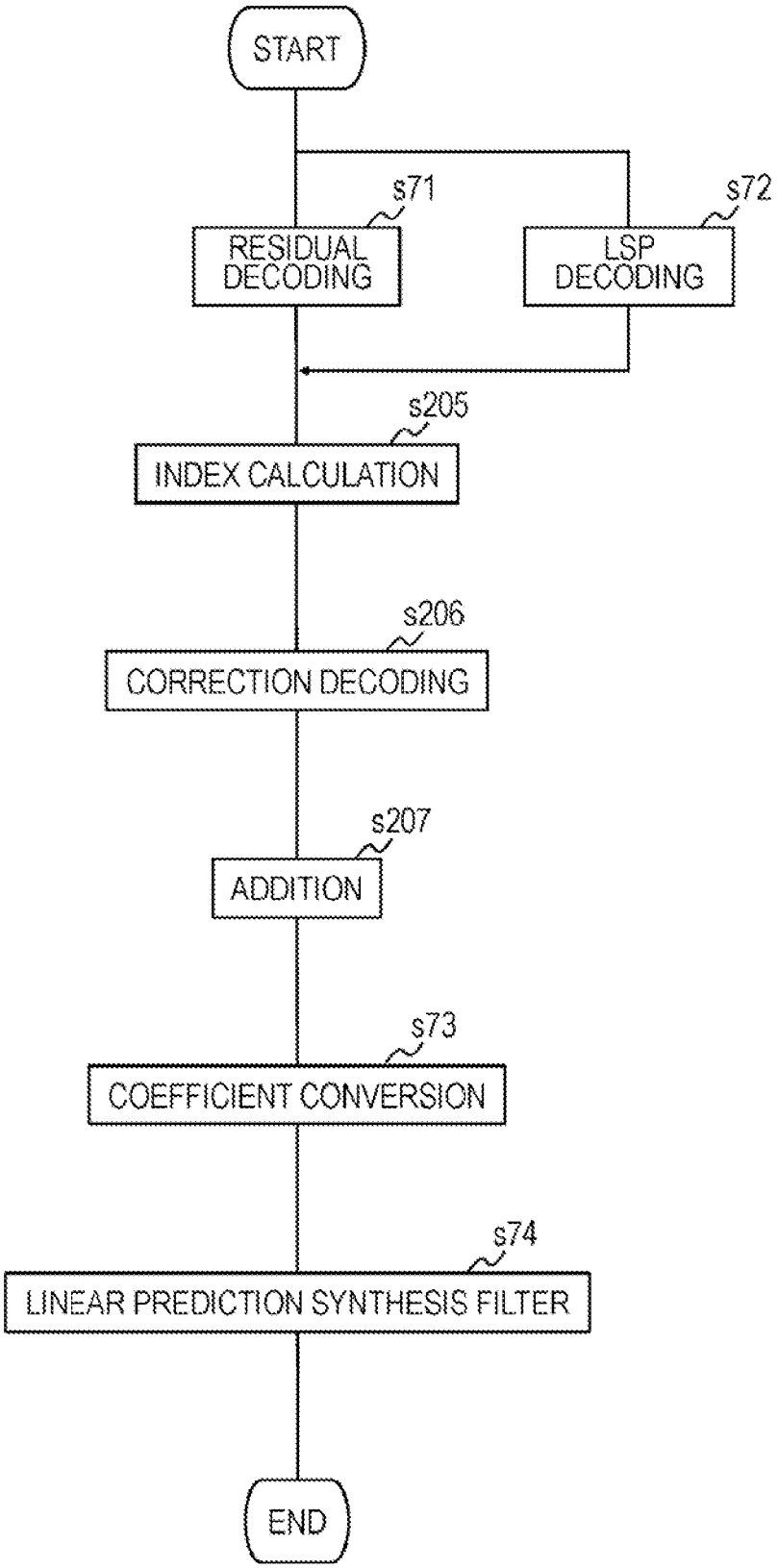
FIG. 6 is a diagram depicting an example of the processing flow of the decoding device according to the first embodiment.

FIG. 5 depicts a functional block diagram of a sound signal decoding device 200 including a linear prediction coefficient decoding device according to the first embodiment, and FIG. 6 depicts an example of the processing flow thereof.

The decoding device 200 includes a residual decoding unit 71, an LSP decoding unit 72, a coefficient conversion unit 73, and a linear prediction synthesis filter unit 74, and further includes an index calculation unit 205, a correction decoding unit 206, and an addition unit 207. Of these units, a portion that receives the LSP code $CL_f$ and the correction LSP code $CL2_f$, decodes the LSP code $CL_f$ and the correction LSP code $CL2_f$, obtains decoded LSP parameters, and outputs the decoded LSP parameters, that is, the portion including the LSP decoding unit 72, the index calculation unit 205, the correction decoding unit 206, and the addition unit 207 is a linear prediction coefficient decoding device 250.

The decoding device 200 receives the LSP code $CL_f$, the correction LSP code $CL2_f$, and the residual code $CR_f$, generates a decoded sound signal $\hat{X}_f$, and outputs the decoded sound signal $\hat{X}_f$.

<Index Calculation Unit 205>

The index calculation unit 205 receives the decoded LSP parameters $\hat{\theta}_f[1], \hat{\theta}_f[2], \ldots, \hat{\theta}_f[p]$ and calculates, by using the decoded LSP parameters $\hat{\theta}_f[1], \hat{\theta}_f[2], \ldots, \hat{\theta}_f[p]$, an index Q commensurate with how great the variation in a spectrum corresponding to the decoded LSP parameters $\hat{\theta}_f[1], \hat{\theta}_f[2], \ldots, \hat{\theta}_f[p]$ is, that is, the index Q which increases with an increase in the peak-to-valley of a spectral envelope and/or an index Q' commensurate with how small the variation in the spectrum is, that is, the index Q' which decreases with an increase in the peak-to-valley of the spectral envelope (s205). In accordance with the magnitude of the index Q and/or Q', the index calculation unit 205 outputs a control signal C to the correction decoding unit 206 such that the correction decoding unit 206 performs decoding processing or performs decoding processing using a predetermined bit number. Moreover, in accordance with the magnitude of the index Q and/or Q', the index calculation unit 205 outputs the control signal C to the addition unit 207 such that the addition unit 207 performs addition processing. The indices Q and Q' are similar to those in the description of the index calculation unit 107 and simply have to be calculated in a similar manner by using the decoded LSP parameters $\hat{\theta}_f[1], \hat{\theta}_f[2], \ldots, \hat{\theta}_f[p]$ in place of the quantization LSP parameters $\theta_f[1], \hat{\theta}_f[2], \ldots, \hat{\theta}_f[p]$.

The index calculation unit 205 outputs, to the correction decoding unit 206 and the addition unit 207, the control signal C indicating that correction decoding processing is performed if the peak-to-valley of the spectral envelope is above the predetermined standard, that is, in the above-described example, if (A−1) the index Q is larger than or equal to the predetermined threshold value Th1 and/or (B−1) the index Q' is smaller than or equal to the predetermined threshold value Th1'; otherwise, the index calculation unit 205 outputs, to the correction decoding unit 206 and the addition unit 207, the control signal C indicating that correction decoding processing is not performed.

Moreover, the index calculation unit 205 may be configured such that the index calculation unit 205 outputs a positive integer (or a code representing a positive integer) representing a predetermined bit number as the control signal C in the case of (A−1) and/or (B−1); otherwise, the index calculation unit 205 outputs 0 as the control signal C.

Incidentally, when the addition unit 207 is configured so as to perform addition processing if the addition unit 207 receives the control signal C and the correction decoding unit 206 is configured so as to perform decoding processing if the correction decoding unit 206 receives the control signal C, the index calculation unit 205 may be configured so as not to output the control signal C in cases other than the case (A−1) and/or (B−1).

<Correction Decoding Unit 206>

The correction decoding unit 206 receives the correction LSP code $CL2_f$ and the control signal C. If the correction decoding unit 206 receives the control signal C indicating that correction decoding processing is performed or a positive integer (or a code representing a positive integer) as the control signal C, in a word, if the peak-to-valley of the spectral envelope is above the predetermined standard, that is, in the above-described example, in the case of (A−1) and/or (B−1), the correction decoding unit 206 decodes the correction LSP code $CL2_f$, obtains decoded LSP parameter differential values $\hat{\theta}diff_f[1], \hat{\theta}diff_f[2], \ldots, \hat{\theta}diff_f[p]$ (s206), and outputs the decoded LSP parameter differential values $\hat{\theta}diff_f[1], \hat{\theta}diff_f[2], \ldots, \hat{\theta}diff_f[p]$. As a decoding method, a decoding method corresponding to the coding method in the correction coding unit 108 of the coding device 100 is used.

For example, the correction decoding unit 206 searches for a correction vector code corresponding to the correction LSP code $CL2_f$ input to the decoding device 200 from a plurality of correction vector codes stored in an unillustrated correction vector codebook and outputs a candidate correction vector corresponding to the correction vector code obtained by the search as the decoded LSP parameter differential values $\hat{\theta}diff_f[1], \hat{\theta}diff_f[2], \ldots, \hat{\theta}diff_f[p]$. Incidentally, the unillustrated correction vector codebook is stored in the decoding device, and, in the correction vector codebook, candidate correction vectors and correction vector codes corresponding to the candidate correction vectors are stored.

If the correction decoding unit 206 receives the control signal C indicating that correction decoding processing is not performed or 0 as the control signal C, in a word, if the peak-to-valley of the spectral envelope is not above the predetermined standard, that is, in the above-described example, in cases other than the case (A−1) and/or (B−1), the correction decoding unit 206 does not perform decoding of the correction LSP code $CL2_f$ and does not output decoded LSP parameter differential values $\hat{\theta}diff_f[1], \hat{\theta}diff_f[2], \ldots, \hat{\theta}diff_f[p]$.

<Addition Unit 207>

The addition unit 207 receives the control signal C and the decoded LSP parameters $\hat{\theta}_f[1], \hat{\theta}_f[2], \ldots, \hat{\theta}_f[p]$. Furthermore, if the addition unit 207 receives the control signal C indicating that correction decoding processing is performed or a positive integer (or a code representing a positive integer) as the control signal C, in a word, if the peak-to-valley of a spectral envelope determined by the decoded LSP parameters $\hat{\theta}_f[1], \hat{\theta}_f[2], \ldots, \hat{\theta}_f[p]$ is above the predetermined standard, that is, in the above-described example, in the case of (A−1) and/or (B−1), the addition unit 207 also receives the decoded LSP parameter differential values $\hat{\theta}diff_f[1], \hat{\theta}diff_f[2], \ldots, \hat{\theta}diff_f[p]$.

If the addition unit 207 receives the control signal C indicating that correction decoding processing is performed or a positive integer (or a code representing a positive integer) as the control signal C, in a word, if the peak-to-valley of the spectral envelope determined by the decoded LSP parameters $\hat{\theta}_f[1], \hat{\theta}_f[2], \ldots, \hat{\theta}_f[p]$ is above the predetermined standard, that is, in the above-described example, in the case of (A−1) and/or (B−1), the addition unit 207 outputs $\hat{\theta}_f[1]+\hat{\theta}diff_f[1], \hat{\theta}_f[2]+\hat{\theta}diff_f[2], \ldots, \hat{\theta}_f[p]+\hat{\theta}diff_f[p]$ obtained by adding the decoded LSP parameters $\hat{\theta}_f[1], \hat{\theta}_f[2], \ldots, \hat{\theta}_f[p]$ and the decoded LSP parameter differential values $\hat{\theta}diff_f[1], \hat{\theta}diff_f[2], \ldots, \hat{\theta}diff_f[p]$ (s207) as decoded LSP parameters $\hat{\theta}_f[1], \hat{\theta}_f[2], \ldots, \hat{\theta}_f[p]$ which are used in the coefficient conversion unit 73.

If the addition unit 207 receives the control signal C indicating that correction decoding processing is not performed or 0 as the control signal C, in a word, if the peak-to-valley of the spectral envelope determined by the decoded LSP parameters $\hat{\theta}_f[1], \hat{\theta}_f[2], \ldots, \hat{\theta}_f[p]$ is not above the predetermined standard, that is, in the above-described example, in cases other than the case (A−1) and/or (B−1), the addition unit 207 outputs the received decoded LSP parameters $\hat{\theta}_f[1], \hat{\theta}_f[2], \ldots, \hat{\theta}_f[p]$ to the coefficient conversion unit 73 without change. As a result, the decoded LSP parameters $\hat{\theta}_f[1], \hat{\theta}_f[2], \ldots, \hat{\theta}_f[p]$ of orders which are output from the LSP decoding unit 72 become the decoded LSP parameters without change which are used in the coefficient conversion unit 73.

<Effect of the First Embodiment>

With such a configuration, it is possible to accurately code and decode coefficients which are convertible into linear prediction coefficients even for a frame in which the spectrum variation is great while suppressing an increase in the code amount as a whole.

<First Modification of the First Embodiment>

In the present embodiment, LSP parameters are described, but other coefficients may be used as long as the coefficients are coefficients which are convertible into linear prediction coefficients. The above may be applied to PARCOR coefficients, coefficients obtained by transforming the LSP parameters or PARCOR coefficients, and linear prediction coefficients themselves. All of these coefficients can be converted into one another in the technical field of speech coding, and the effect of the first embodiment can be obtained by using any one of these coefficients. Incidentally, the LSP code $CL_f$ or a code corresponding to the LSP code $CL_f$ is also referred to as a first code and the LSP coding unit is also referred to as a first coding unit. Likewise, the correction LSP code $CL2_f$ or a code corresponding to the correction LSP code $CL2_f$ is also referred to as a second code and the correction coding unit is also referred to as a second coding unit. Moreover, the decoded LSP parameters $\hat{\theta}_f[1], \hat{\theta}_f[2], \ldots, \hat{\theta}_f[p]$ are also referred to as first decoded values and the LSP decoding unit is also referred to as a first decoding unit. Furthermore, the decoded LSP parameter differential values $\hat{\theta}diff_f[1], \hat{\theta}diff_f[2], \ldots, \hat{\theta}diff_f[p]$ are also referred to as second decoded values and the correction decoding unit is also referred to as a second decoding unit.

As mentioned above, in place of LSP parameters, other coefficients may be used as long as the coefficients are coefficients which are convertible into linear prediction coefficients. Hereinafter, a case in which PARCOR coefficients $k_f[1], k_f[2], \ldots, k_f[p]$ are used will be described.

It is known that the higher the peak-to-valley height of a spectral envelope corresponding to LSP parameters $\theta[1], \theta[2], \ldots, \theta[p]$ is, the smaller a value of $$\prod_{i}^{p}(1 - k[i]^2)$$

determined by a PARCOR coefficient becomes. Thus, when the PARCOR coefficients are used, the index calculation unit 107 receives quantized PARCOR coefficients $\hat{k}_f[1], \hat{k}_f[2], \ldots, \hat{k}_f[p]$ and calculates an index Q' commensurate with how short the peak-to-valley height of a spectral envelope is by $$Q' = \prod_{i}^{p}(1 - \hat{k}_f[i]^2)$$

(s107). In accordance with the magnitude of the index Q', the index calculation unit 107 outputs, to the correction coding unit 108 and the addition unit 109, the control signal C indicating that correction coding processing is performed/not performed or the control signal C which is a positive integer representing a predetermined bit number or is 0. Likewise, in accordance with the magnitude of the index Q', the index calculation unit 205 outputs, to the correction decoding unit 206 and the addition unit 207, the control signal C indicating that correction decoding processing is performed/not performed or the control signal C which is a positive integer representing a predetermined bit number or is 0.

<Second Modification of the First Embodiment>

The index calculation unit 107 and the index calculation unit 205 may be configured so as to output the index Q and/or the index Q' in place of the control signal C. In that case, in accordance with the magnitude of the index Q and/or the index Q', the correction coding unit 108 and the correction decoding unit 206 simply have to determine whether or not to perform coding and decoding, respectively. Moreover, likewise, in accordance with the magnitude of the index Q and/or the index Q', the addition unit 109 and the addition unit 207 simply have to determine whether or not to perform addition processing, respectively. The determinations made in the correction coding unit 108, the correction decoding unit 206, the addition unit 109, and the addition unit 207 are the same as those explained in the above-described index calculation unit 107 and index calculation unit 205.

Second Embodiment

Hereinafter, differences from the first embodiment will be mainly described.

<Linear Prediction Coefficient Coding Device 300 According to the Second Embodiment>

Figure 7:
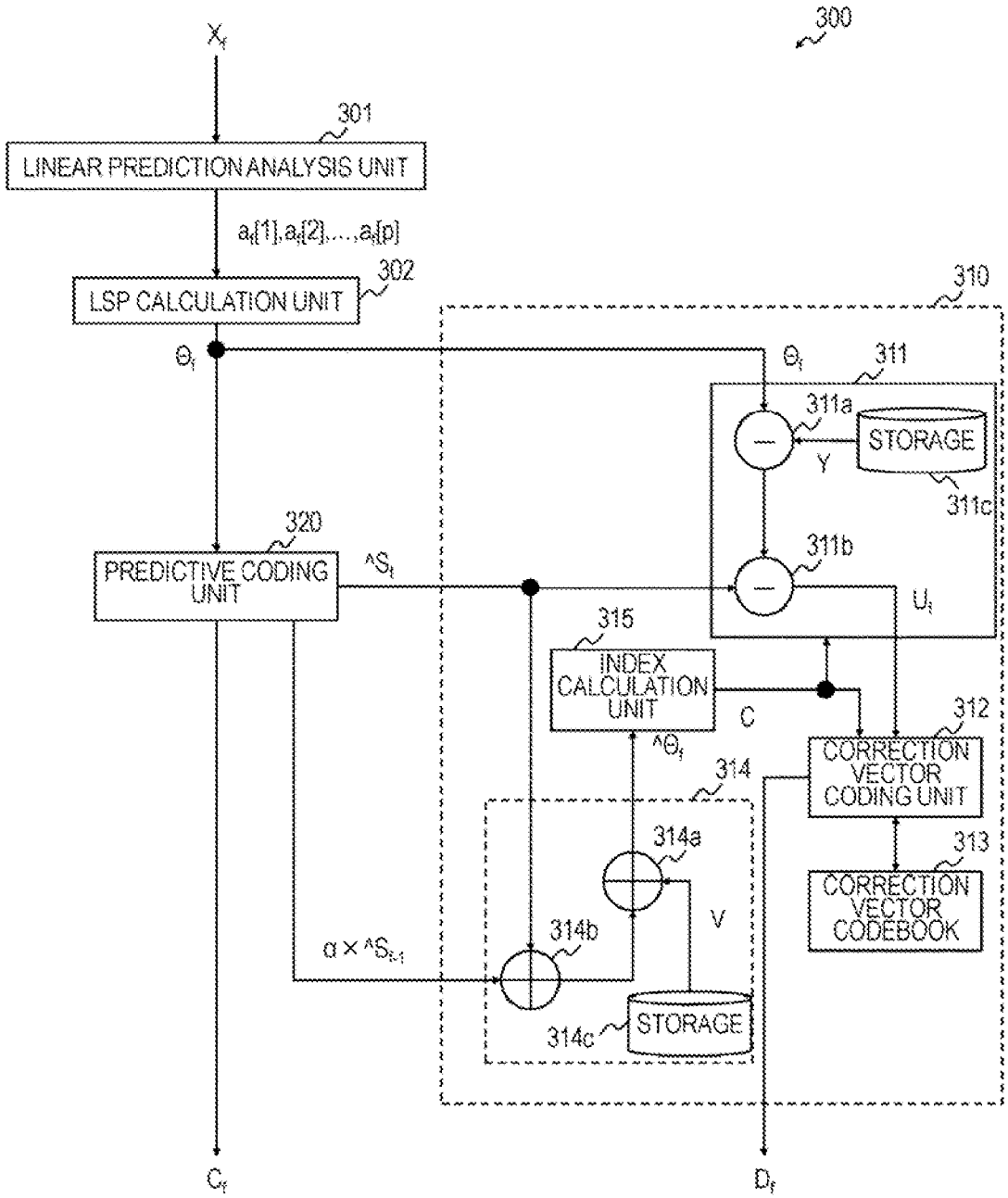
FIG. 7 is a functional block diagram of a linear prediction coefficient coding device according to a second embodiment.
Figure 8:
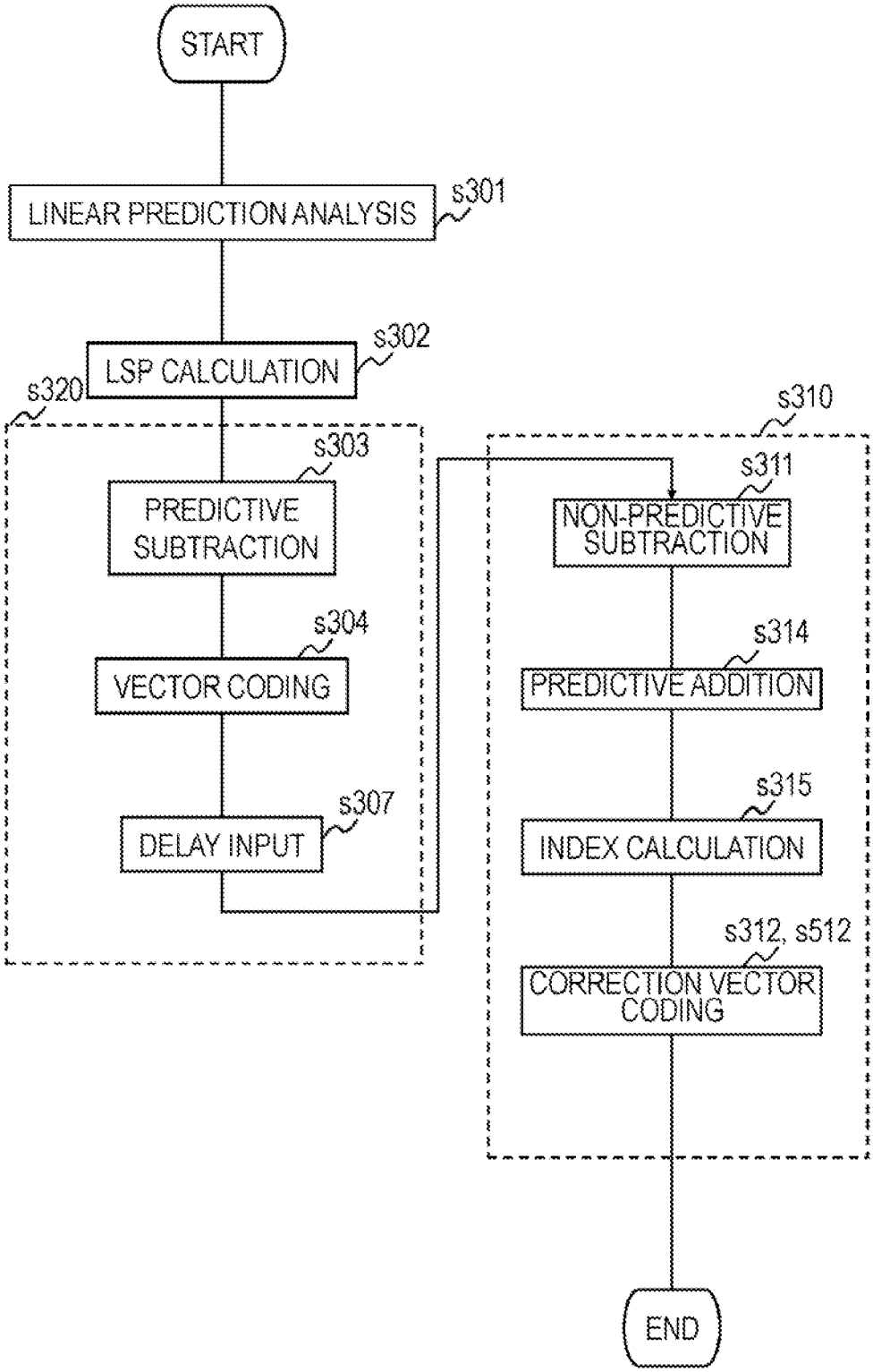
FIG. 8 is a diagram depicting an example of the processing flow of the linear prediction coefficient coding device according to the second and third embodiments.

FIG. 7 depicts a functional block diagram of a linear prediction coefficient coding device 300 according to the second embodiment, and FIG. 8 depicts an example of the processing flow thereof.

The linear prediction coefficient coding device 300 includes a linear prediction analysis unit 301, an LSP calculation unit 302, a predictive coding unit 320, and a non-predictive coding unit 310.

The linear prediction coefficient coding device 300 receives a sound signal $X_f$, obtains an LSP code $C_f$ and a correction LSP code $D_f$, and outputs the LSP code $C_f$ and the correction LSP code $D_f$.

Incidentally, if LSP parameters $\theta_f[1], \theta_f[2], \ldots, \theta_f[p]$ derived from the sound signal $X_f$ are generated by another device and the input of the linear prediction coefficient coding device 300 is the LSP parameters $\theta_f[1], \theta_f[2], \ldots, \theta_f[p]$, the linear prediction coefficient coding device 300 does not have to include the linear prediction analysis unit 301 and the LSP calculation unit 302.

<Linear Prediction Analysis Unit 301>

The linear prediction analysis unit 301 receives an input sound signal $X_f$, obtains linear prediction coefficients $a_f[1], a_f[2], \ldots, a_f[p]$ by performing linear prediction analysis on the input sound signal $X_f$ (s301), and outputs the linear prediction coefficients $a_f[1], a_f[2], \ldots, a_f[p]$. Here, $a_f[i]$ represents an ith-order linear prediction coefficient that is obtained by performing linear prediction analysis on an input sound signal $X_f$ of an fth frame.

<LSP Calculation Unit 302>

The LSP calculation unit 302 receives the linear prediction coefficients $a_f[1], a_f[2], \ldots, a_f[p]$, obtains LSP (Line Spectrum Pairs) parameters $\theta_f[1], \theta_f[2], \ldots, \theta_f[p]$ from the linear prediction coefficients $a_f[1], a_f[2], \ldots, a_f[p]$ (s302), and outputs an LSP parameter vector $\Theta_f=(\theta_f[1], \theta_f[2], \ldots, \theta_f[p])^T$ that is a vector of the arranged LSP parameters. Here, $\theta_f[i]$ is an ith-order LSP parameter corresponding to the input sound signal $X_f$ of the fth frame.

<Predictive Coding Unit 320>

Figure 9:
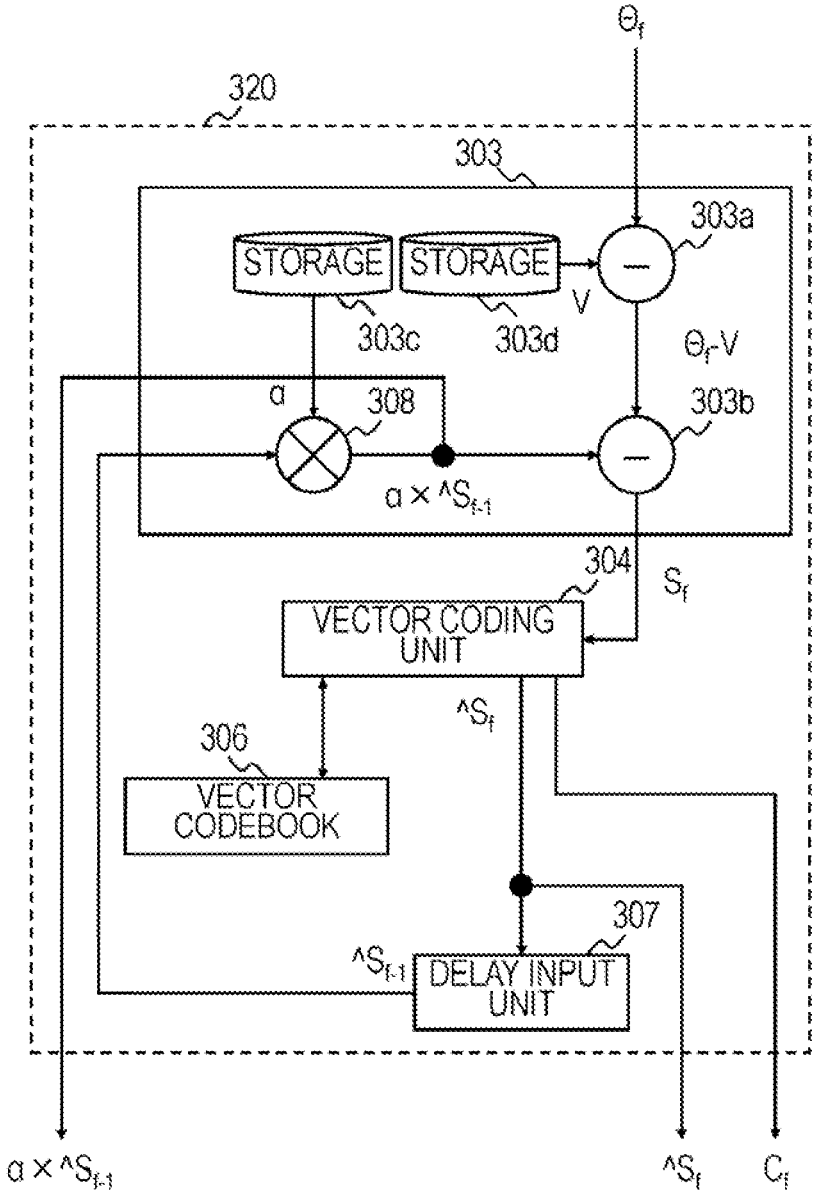
FIG. 9 is a functional block diagram of a predictive coding unit of the linear prediction coefficient coding device according to the second embodiment.

FIG. 9 depicts a functional block diagram of the predictive coding unit 320.

The predictive coding unit 320 includes a predictive subtraction unit 303, a vector coding unit 304, a vector codebook 306, and a delay input unit 307.

The predictive coding unit 320 receives the LSP parameter vector $\Theta_f=\theta_f[1], \theta_f[2], \ldots, \theta_f[p]$, codes a differential vector $S_f$ formed of differentials between the LSP parameter vector $\Theta_f$ and a prediction vector containing at least a prediction based on a past frame, obtains an LSP code $C_f$ and a quantization differential vector $\hat{S}_f$ corresponding to the LSP code $C_f$ (s320), and outputs the LSP code $C_f$ and the quantization differential vector $\hat{S}_f$. Furthermore, the predictive coding unit 320 obtains a vector representing a prediction based on a past frame, the prediction contained in the prediction vector, and outputs the vector. Incidentally, the quantization differential vector $\hat{S}_f$ corresponding to the LSP code $C_f$ is a vector formed of quantization values corresponding to the element values of the differential vector $S_f$.

Here, the prediction vector containing at least a prediction based on a past frame is, for example, a vector $V+\alpha\times\hat{S}_{f-1}$ obtained by adding a predetermined predictive mean vector V and a vector obtained by multiplying each element of a quantization differential vector (a preceding-frame quantization differential vector) $\hat{S}_{f-1}$ of the immediately preceding frame by predetermined $\alpha$. In this example, the vector representing a prediction based on a past frame, the prediction contained in the prediction vector, is $\alpha\times\hat{S}_{f-1}$ which is a times as long as the preceding-frame quantization differential vector $\hat{S}_{f-1}$.

Incidentally, since the predictive coding unit 320 does not need any input from the outside other than the LSP parameter vector $\Theta_f$, it can be said that the predictive coding unit 320 obtains the LSP code $C_f$ by coding the LSP parameter vector $\Theta_f$.

Processing of each unit in the predictive coding unit 320 will be described.

<Predictive Subtraction Unit 303>

The predictive subtraction unit 303 is formed of, for example, a storage 303c storing a predetermined coefficient $\alpha$, a storage 303d storing a predictive mean vector V, a multiplication unit 308, and subtraction units 303a and 303b.

The predictive subtraction unit 303 receives the LSP parameter vector $\Theta_f$ and the preceding-frame quantization differential vector $\hat{S}_{f-1}$.

The predictive subtraction unit 303 generates a differential vector $S_f=\Theta_f-V-\alpha\times\hat{S}_{f-1}$ that is a vector obtained by subtracting the predictive mean vector V and a vector $\alpha\times\hat{S}_{f-1}$ from the LSP parameter vector $\Theta_f$ (s303) and outputs the differential vector $S_f$.

Incidentally, the predictive mean vector $V=(v[1], v[2], \ldots, v[p])^T$ is a predetermined vector stored in the storage 303d and simply has to be obtained in advance from, for example, a sound signal for learning. For example, in the linear prediction coefficient coding device 300, by using a sound signal picked up in the same environment (for instance, the same speaker, sound pick-up device, and place) as the sound signal to be coded as an input sound signal for learning, LSP parameter vectors of many frames are obtained, and the average of the LSP parameter vectors is used as the predictive mean vector.

The multiplication unit 308 obtains the vector $\alpha\times\hat{S}_{f-1}$ by multiplying the preceding-frame quantization differential vector $\hat{S}_{f-1}$ by the predetermined coefficient $\alpha$ stored in the storage 303c.

Incidentally, in FIG. 9, by using the two subtraction units 303a and 303b, first, after the predictive mean vector V stored in the storage 303d is subtracted from the LSP parameter vector $\Theta_f$ in the subtraction unit 303a, the vector $\alpha\times\hat{S}_{f-1}$ is subtracted in the subtraction unit 303b, but the above may be performed the other way around. Alternatively, the differential vector $S_f$ may be generated by subtracting, from the LSP parameter vector $\Theta_f$, a vector $V+\alpha\times\hat{S}_{f-1}$ obtained by adding the predictive mean vector V and the vector $\alpha\times\hat{S}_{f-1}$.

It can be said that the differential vector $S_f$ of the present frame is a vector that is obtained by subtracting, from coefficients (an LSP parameter vector $\Theta_f$) which are convertible into linear prediction coefficients of more than one order of the present frame, a vector containing at least a prediction based on a past frame.

<Vector Coding Unit 304>

The vector coding unit 304 receives the differential vector $S_f$, codes the differential vector $\hat{S}_f$, obtains an LSP code $C_f$ and a quantization differential vector $\hat{S}_f$ corresponding to the LSP code $C_f$, and outputs the LSP code $C_f$ and the quantization differential vector $\hat{S}_f$. For coding of the differential vector $S_f$, any one of the well-known coding methods may be used, such as a method of vector quantizing the differential vector $S_f$, a method of dividing the differential vector $S_f$ into a plurality of subvectors and vector quantizing each of the subvectors, a method of multistage vector quantizing the differential vector $S_f$ or the subvectors, a method of scalar quantizing the elements of a vector, and a method obtained by combining these methods.

Here, an example of a case in which the method of vector quantizing the differential vector $S_f$ is used will be described.

A candidate differential vector closest to the differential vector $S_f$ is searched for from a plurality of candidate differential vectors stored in the vector codebook 306 and is output as a quantization differential vector $\hat{S}_f=(\hat{s}_f[1], \hat{s}_f[2], \ldots, \hat{s}_f[p])^T$, and a differential vector code corresponding to the quantization differential vector $\hat{S}_f$ is output as the LSP code $C_f$ (s304). Incidentally, the quantization differential vector $\hat{S}_f$ corresponds to a decoded differential vector which will be described later.

<Vector Codebook 306>

In the vector codebook 306, candidate differential vectors and differential vector codes corresponding to the candidate differential vectors are stored in advance.

<Delay Input Unit 307>

The delay input unit 307 receives the quantization differential vector $\hat{S}_f$, holds the quantization differential vector $\hat{S}_f$, delays the quantization differential vector $\hat{S}_f$ by one frame, and outputs the resultant vector as a preceding-frame quantization differential vector $\hat{S}_{f-1}$ (s307). That is, if the predictive subtraction unit 303 has performed processing on a quantization differential vector $\hat{S}_f$ of an fth frame, the delay input unit 307 outputs a quantization differential vector $\hat{S}_{f-1}$ on an f−1th frame.

Incidentally, although generation thereof is not performed in the predictive coding unit 320, it can be said that a predictive quantization LSP parameter vector $\hat{\Theta}_f$ obtained by quantizing each element of the LSP parameter vector $\Theta_f$ in the predictive coding unit 320 is what is obtained by adding the prediction vector $V+\alpha\times\hat{S}_{f-1}$ to the quantization differential vector $\hat{S}_f$. That is, the predictive quantization LSP parameter vector is $\hat{\Theta}_f = \hat{S}_f + V + \alpha \times \hat{S}_{f-1}$. Moreover, a quantization error vector in the predictive coding unit 320 is $\Theta_f - \hat{\Theta}_f = \Theta_f - (\hat{S}_f + V + \alpha \times \hat{S}_{f-1})$.

<Non-Predictive Coding Unit 310>

The non-predictive coding unit 310 includes a non-predictive subtraction unit 311, a correction vector coding unit 312, a correction vector codebook 313, a predictive addition unit 314, and an index calculation unit 315. In accordance with the calculation result of the index calculation unit 315, a determination as to whether or not subtraction processing is performed in the non-predictive subtraction unit 311 and a determination as to whether or not processing is performed in the correction vector coding unit 312 are made. The index calculation unit 315 corresponds to the index calculation unit 107 of the first embodiment.

The non-predictive coding unit 310 receives the LSP parameter vector $\Theta_f$, the quantization differential vector $\hat{S}_f$, and the vector $\alpha \times \hat{S}_{f-1}$. The non-predictive coding unit 310 obtains a correction LSP code $D_f$ by coding a correction vector that is a differential between the LSP parameter vector $\Theta_f$ and the quantization differential vector $\hat{S}_f$ (s310) and outputs the correction LSP code $D_f$.

Here, since the correction vector is $\Theta_f - \hat{S}_f$ and the quantization error vector of the predictive coding unit 320 is $\Theta_f - \hat{\Theta}_f = \Theta_f - (\hat{S}_f + V + \alpha \times \hat{S}_{f-1})$, the correction vector $\Theta_f - \hat{S}_f$ is what is obtained by adding the quantization error vector $\Theta_f - \hat{\Theta}_f$ of the predictive coding unit 320, the predictive mean vector V, and $\alpha \times \hat{S}_{f-1}$ which is the preceding-frame quantization differential vector multiplied by $\alpha$ ($\Theta_f - \hat{S}_f = \Theta_f - \hat{\Theta}_f + V + \alpha \times \hat{S}_{f-1}$). That is, it can be said that the non-predictive coding unit 310 obtains a correction LSP code $D_f$ by coding what is obtained by adding the quantization error vector $\Theta_f - \hat{\Theta}_f$ and the prediction vector $V + \alpha \times \hat{S}_{f-1}$ and obtains a correction LSP code $D_f$ by coding at least the quantization error vector $\Theta_f - \hat{\Theta}_f$ of the predictive coding unit 320.

Any one of the well-known coding methods may be used for coding the correction vector $\Theta_f - \hat{S}_f$; in the following description, a method of vector quantizing what is obtained by subtracting a non-predictive mean vector Y from the correction vector $\Theta_f - \hat{S}_f$ will be described. Incidentally, in the following description, $U_f = \Theta_f - Y - \hat{S}_f$ that is a vector obtained by subtracting the non-predictive mean vector Y from the correction vector $\Theta_f - \hat{S}_f$ is referred to as a correction vector for descriptive purposes.

Hereinafter, processing of each unit will be described.

<Predictive Addition Unit 314>

The predictive addition unit 314 is formed of, for example, a storage 314c storing a predictive mean vector V and addition units 314a and 314b. The predictive mean vector V stored in the storage 314c is the same as the predictive mean vector V stored in the storage 303d in the predictive coding unit 320.

The predictive addition unit 314 receives the quantization differential vector $\hat{S}_f$ of the present frame and the vector $\alpha \times \hat{S}_{f-1}$ obtained by multiplying the preceding-frame quantization differential vector $\hat{S}_{f-1}$ by a predetermined coefficient $\alpha$.

The predictive addition unit 314 generates a predictive quantization LSP parameter vector $\hat{\Theta}_f (= \hat{S}_f + V + \alpha \hat{S}_{f-1}) = (\hat{\theta}_f[1], \hat{\theta}_f[2], \ldots, \hat{\theta}_f[p])^T$ that is a vector obtained by adding the quantization differential vector $\hat{S}_f$, the predictive mean vector V, and the vector $\alpha \times \hat{S}_{f-1}$ (s314) and outputs the predictive quantization LSP parameter vector $\hat{\Theta}_f$.

In FIG. 7, by using the two addition units 314a and 314b, first, after the vector $\alpha \times \hat{S}_{f-1}$ is added to the quantization differential vector $\hat{S}_f$ of the present frame in the addition unit 314b, the predictive mean vector V is added in the addition unit 314a, but the above may be performed the other way around. Alternatively, the predictive quantization LSP parameter vector $\hat{\Theta}_f$ may be generated by adding a vector obtained by adding the vector $\alpha \times \hat{S}_{f-1}$ and the predictive mean vector V to the quantization differential vector $\hat{S}_f$.

Incidentally, since both the quantization differential vector $\hat{S}_f$ of the present frame and the vector $\alpha \times \hat{S}_{f-1}$ obtained by multiplying the preceding-frame quantization differential vector $\hat{S}_{f-1}$ by the predetermined coefficient $\alpha$, the quantization differential vector $\hat{S}_f$ and the vector $\alpha \times \hat{S}_{f-1}$ being input to the predictive addition unit 314, are generated in the predictive coding unit 320 and the predictive mean vector V stored in the storage 314c in the predictive addition unit 314 is the same as the predictive mean vector V stored in the storage 303d in the predictive coding unit 320, a configuration may be adopted in which the predictive coding unit 320 generates the predictive quantization LSP parameter vector $\hat{\Theta}_f$ by performing the processing which is performed by the predictive addition unit 314 and outputs the predictive quantization LSP parameter vector $\hat{\Theta}_f$ to the non-predictive coding unit 310 and the non-predictive coding unit 310 does not include the predictive addition unit 314.

<Index Calculation Unit 315>

The index calculation unit 315 receives the predictive quantization LSP parameter vector $\hat{\Theta}_f$ and calculates an index Q commensurate with how high the peak-to-valley height of a spectral envelope corresponding to the predictive quantization LSP parameter vector $\hat{\Theta}_f$ is, that is, the index Q which increases with an increase in the peak-to-valley of the spectral envelope and/or an index Q' commensurate with how short the peak-to-valley height of the spectral envelope is, that is, the index Q' which decreases with an increase in the peak-to-valley of the spectral envelope (s315). In accordance with the magnitude of the index Q and/or Q', the index calculation unit 315 outputs a control signal C to the correction vector coding unit 312 such that the correction vector coding unit 312 performs coding processing or performs coding processing using a predetermined bit number. Moreover, in accordance with the magnitude of the index Q and/or Q', the index calculation unit 315 outputs the control signal C to the non-predictive subtraction unit 311 such that the non-predictive subtraction unit 311 performs subtraction processing. The indices Q and Q' are similar to those in the description of the index calculation unit 107 and simply have to be calculated in a similar manner by using the prediction quantization LSP parameters $\hat{\theta}_f[1], \hat{\theta}_f[2], \ldots, \hat{\theta}_f[p]$ which are the elements of the predictive quantization LSP parameter vector $\hat{\Theta}_f$ in place of the quantization LSP parameters $\hat{\theta}_f[1], \hat{\theta}_f[2], \ldots, \hat{\theta}_f[p]$.

If the peak-to-valley of the spectral envelope is above the predetermined standard, that is, in the above-described example, if (A−1) the index Q is larger than or equal to the predetermined threshold value Th1 and/or (B−1) the index Q' is smaller than or equal to the predetermined threshold value Th1', the index calculation unit 315 outputs, to the non-predictive subtraction unit 311 and the correction vector coding unit 312, the control signal C indicating that correction coding processing is performed; otherwise, the index calculation unit 315 outputs, to the non-predictive subtraction unit 311 and the correction vector coding unit 312, the control signal C indicating that correction coding processing is not performed.

Moreover, the index calculation unit 315 may be configured such that the index calculation unit 315 outputs a positive integer (or a code representing a positive integer)

representing a predetermined bit number as the control signal C in the case of (A−1) and/or (B−1); otherwise, the index calculation unit 315 outputs 0 as the control signal C.

Incidentally, when the non-predictive subtraction unit 311 is configured so as to perform subtraction processing if the non-predictive subtraction unit 311 receives the control signal C and the correction vector coding unit 312 is configured so as to perform coding processing if the correction vector coding unit 312 receives the control signal C, the index calculation unit 315 may be configured so as not to output the control signal C in cases other than the case (A−1) and/or (B−1).

<Non-Predictive Subtraction Unit 311>

The non-predictive subtraction unit 311 is formed of, for example, a storage 311c storing a non-predictive mean vector $Y=(y[1], y[2], \ldots, y[p])^T$ and subtraction units 311a and 311b.

The non-predictive subtraction unit 311 receives the control signal C, the LSP parameter vector $\Theta_f$, and the quantization differential vector $\hat{S}_f$.

If the non-predictive subtraction unit 311 receives the control signal C indicating that correction coding processing is performed or a positive integer (or a code representing a positive integer) as the control signal C, in a word, if the peak-to-valley of the spectral envelope is above the predetermined standard, that is, in the above-described example, in the case of (A−1) and/or (B−1), the non-predictive subtraction unit 311 generates a correction vector $U_f=\Theta_f-Y-\hat{S}_f=(u_f[1], u_f[2], \ldots, u_f[p])$ that is a vector obtained by subtracting the quantization differential vector $\hat{S}_f=(\hat{s}_f[1], \hat{s}_f[2], \ldots, \hat{s}_f[p])^T$ and the non-predictive mean vector $Y=(y[1], y[2], \ldots, y[p])^T$ from the LSP parameter vector $\Theta_f=(\theta_f[1], \theta_f[2], \ldots, \theta_f[p])^T$ (s311) and outputs the correction vector $U_f$.

Incidentally, in FIG. 7, by using the two subtraction units 311a and 311b, first, after the non-predictive mean vector Y stored in the storage 311c is subtracted from the LSP parameter vector $\Theta_f$ in the subtraction unit 311a, the quantization differential vector $\hat{S}_f$ is subtracted in the subtraction unit 311b, but these subtractions may be performed the other way around. Alternatively, the correction vector $U_f$ may be generated by subtracting a vector obtained by adding the non-predictive mean vector Y and the quantization differential vector $\hat{S}_f$ from the LSP parameter vector $\Theta_f$.

Incidentally, the non-predictive mean vector Y is a predetermined vector and simply has to be obtained in advance from, for example, a sound signal for learning. For example, in the linear prediction coefficient coding device 300, by using a sound signal picked up in the same environment (for instance, the same speaker, sound pick-up device, and place) as the sound signal to be coded as an input sound signal for learning, differentials between the LSP parameter vectors and the quantization differential vectors for the LSP parameter vectors of many frames are obtained, and the average of the differentials is used as the non-predictive mean vector.

Incidentally, the correction vector $U_f$ is represented as follows:

$$U_f=\Theta_f-Y-\hat{S}_f=(\theta_f-\hat{\Theta}_f)-Y+\alpha\times\hat{S}_{f-1}+V.$$

Thus, the correction vector $U_f$ contains at least a quantization error $(\Theta_f-\hat{\Theta}_f)$ of coding of the predictive coding unit 320.

If the non-predictive subtraction unit 311 receives the control signal C indicating that correction coding processing is not performed or 0 as the control signal C, in a word, if the peak-to-valley of the spectral envelope is not above the predetermined standard, that is, in the above-described example, in cases other than the case (A−1) and/or (B−1), the non-predictive subtraction unit 311 does not have to generate a correction vector $U_f$.

<Correction Vector Codebook 313>

In the correction vector codebook 313, candidate correction vectors and correction vector codes corresponding to the candidate correction vectors are stored.

<Correction Vector Coding Unit 312>

The correction vector coding unit 312 receives the control signal C and the correction vector $U_f$. If the correction vector coding unit 312 receives the control signal C indicating that correction coding processing is performed or a positive integer (or a code representing a positive integer) as the control signal C, in a word, if the peak-to-valley of the spectral envelope is above the predetermined standard, that is, in the above-described example, in the case of (A−1) and/or (B−1), the correction vector coding unit 312 obtains a correction LSP code $D_f$ by coding the correction vector $U_f$ (s312) and outputs the correction LSP code $D_f$. For example, the correction vector coding unit 312 searches for a candidate correction vector closest to the correction vector $U_f$ from a plurality of candidate correction vectors stored in the correction vector codebook 313 and uses a correction vector code corresponding to the candidate correction vector as the correction LSP code $D_f$.

Incidentally, as described earlier, since the correction vector $U_f$ contains at least the quantization error $(\Theta_f-\hat{\Theta}_f)$ of coding of the predictive coding unit 320, it can be said that the correction vector coding unit 312 codes at least the quantization error $(\Theta_f-\hat{\Theta}_f)$ of the predictive coding unit 320 if the peak-to-valley of the spectral envelope is above the predetermined standard, that is, in the above-described example, in the case of (A−1) and/or (B−1).

If the correction vector coding unit 312 receives the control signal C indicating that correction coding processing is not performed or 0 as the control signal C, in a word, if the peak-to-valley of the spectral envelope is not above the predetermined standard, that is, in the above-described example, in cases other than the case (A−1) and/or (B−1), the correction vector coding unit 312 does not perform coding of the correction vector $U_f$ and does not obtain and output a correction LSP code $D_f$.

<Linear Prediction Coefficient Decoding Device 400 According to the Second Embodiment>

Figure 10:
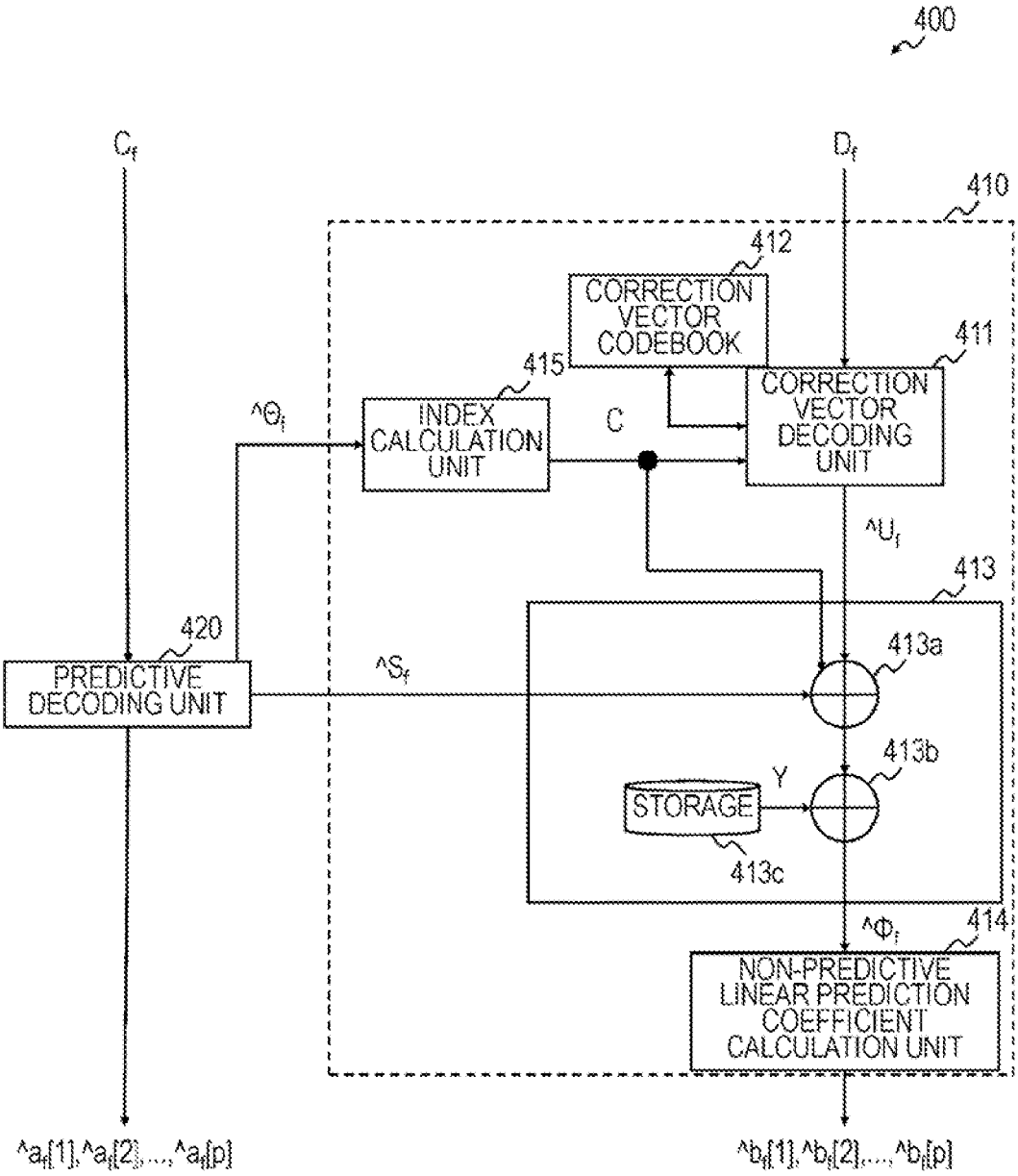
FIG. 10 is a functional block diagram of a linear prediction coefficient decoding device according to the second embodiment.
Figure 11:
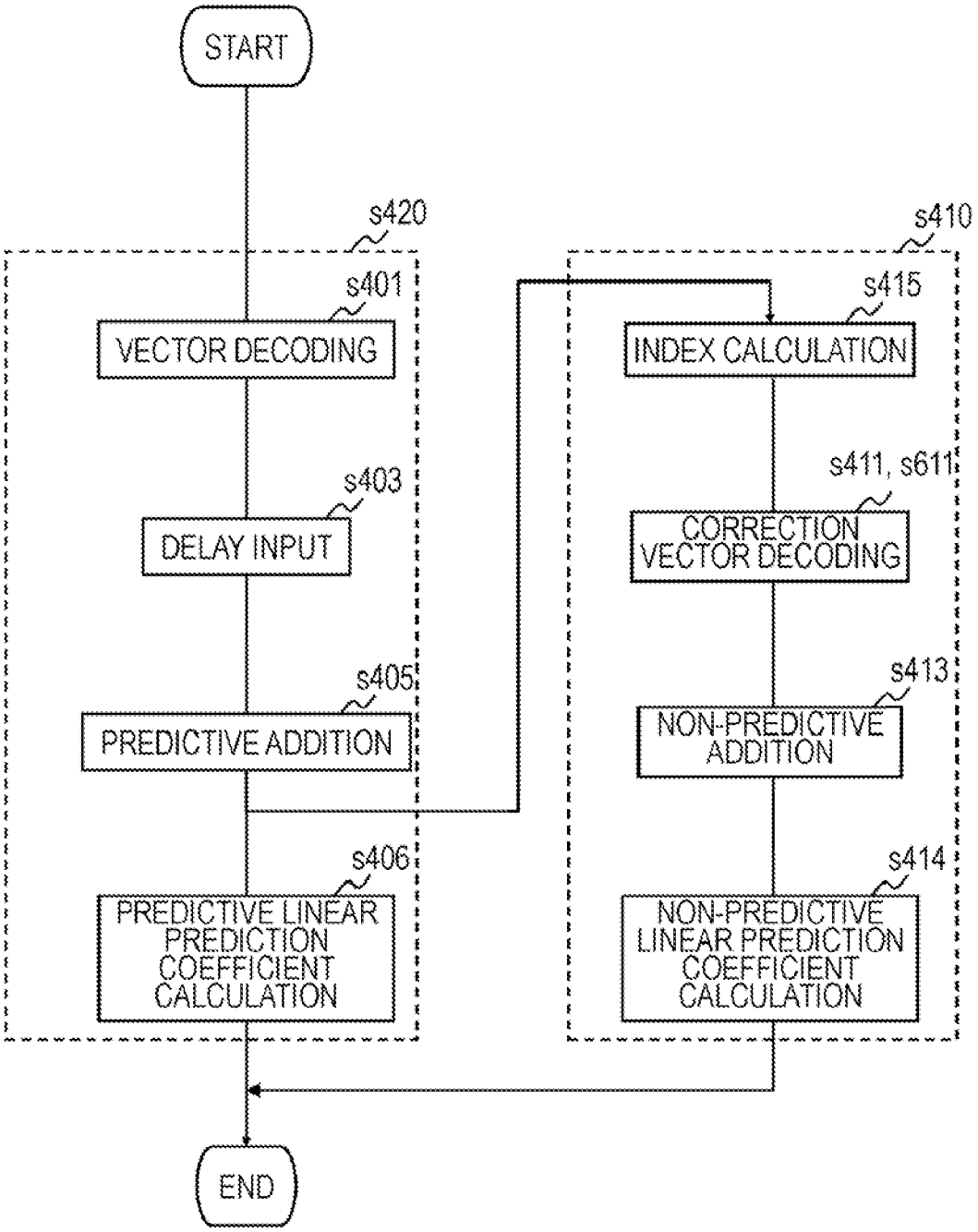
FIG. 11 is a diagram depicting an example of the processing flow of the linear prediction coefficient decoding device according to the second and third embodiments.

FIG. 10 depicts a functional block diagram of a linear prediction coefficient decoding device 400 according to the second embodiment, and FIG. 11 depicts an example of the processing flow thereof.

The linear prediction coefficient decoding device 400 of the second embodiment includes a predictive decoding unit 420 and a non-predictive decoding unit 410.

The linear prediction coefficient decoding device 400 receives the LSP code $C_f$ and the correction LSP code $D_f$, generates decoded predictive LSP parameters $\hat{\theta}_f[1], \hat{\theta}_f[2], \ldots, \hat{\theta}_f[p]$ and decoded non-predictive LSP parameters $\hat{\phi}_f[1], \hat{\phi}_f[2], \ldots, \hat{\phi}_f[p]$, and outputs the decoded predictive LSP parameters $\hat{\theta}_f[1], \hat{\theta}_f[2], \ldots, \hat{\theta}_f[p]$ and the decoded non-predictive LSP parameters $\hat{\phi}_f[1], \hat{\phi}_f[2], \ldots, \hat{\phi}_f[p]$. Moreover, if necessary, the linear prediction coefficient decoding device 400 generates decoded predictive linear prediction coefficients $\hat{a}_f[1], \hat{a}_f[2], \ldots, \hat{a}_f[p]$ and decoded non-predictive linear prediction coefficients $\hat{b}_f[1], \hat{b}_f[2], \ldots, \hat{b}_f[p]$ which are obtained by converting the decoded predictive LSP parameters $\hat{\theta}_f[1], \hat{\theta}_f[2], \ldots, \hat{\theta}_f[p]$ and the decoded non-predictive LSP parameters $\hat{\phi}_f[1], \hat{\phi}_f[2], \ldots, \hat{\theta}_f[p]$, respectively, into linear prediction coefficients, and outputs the decoded predictive linear prediction coefficients $\hat{a}_f[1], \hat{a}_f[2], \ldots, \hat{a}_f[p]$ and the decoded non-predictive linear prediction coefficients $\hat{b}_f[1], \hat{b}_f[2], \ldots, \hat{b}_f[p]$.

<Predictive Decoding Unit 420>

Figure 12:
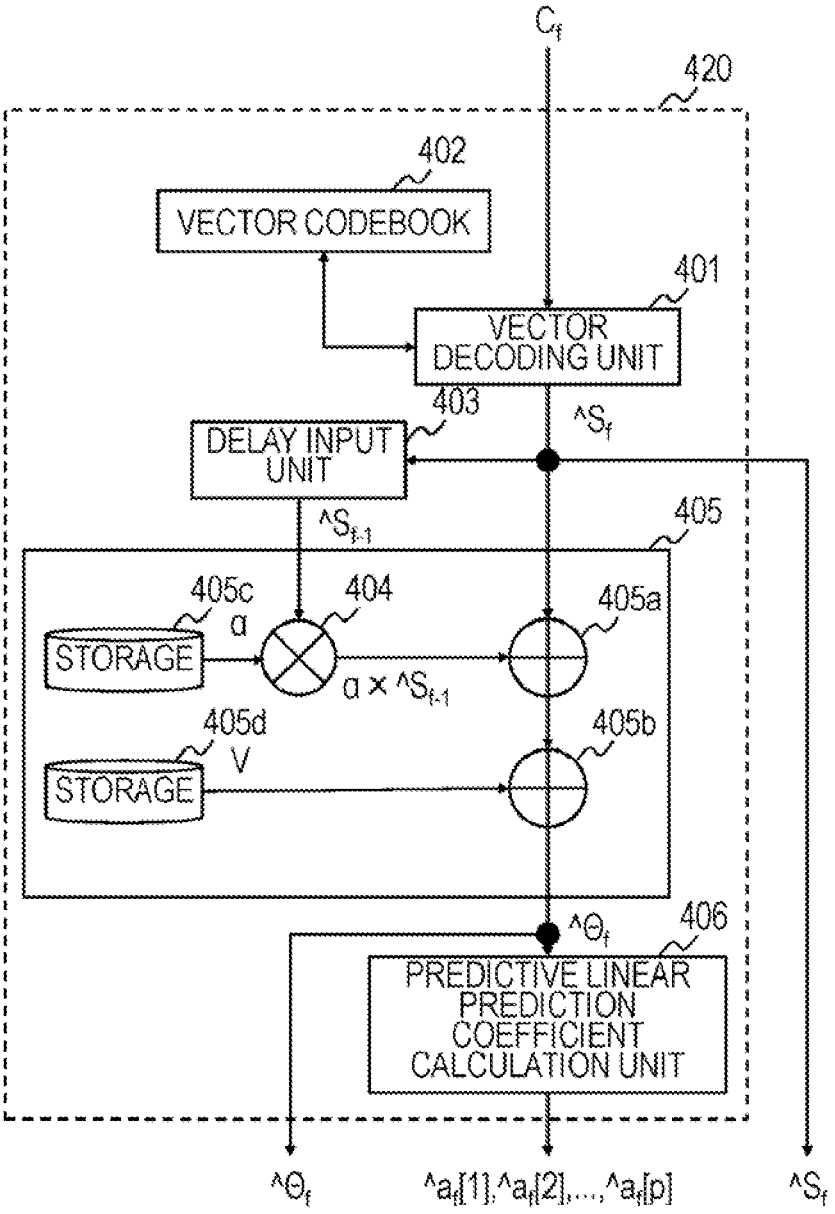
FIG. 12 is a functional block diagram of a predictive decoding unit of the linear prediction coefficient decoding device according to the second embodiment.

FIG. 12 depicts a functional block diagram of the predictive decoding unit 420.

The predictive decoding unit 420 includes a vector codebook 402, a vector decoding unit 401, a delay input unit 403, and a predictive addition unit 405, and, when necessary, also includes a predictive linear prediction coefficient calculation unit 406.

The predictive decoding unit 420 receives the LSP code $C_f$, obtains a decoded differential vector $\hat{S}_f$ by decoding the LSP code $C_f$, and outputs the decoded differential vector $\hat{S}_f$. Furthermore, the predictive decoding unit 420 generates a decoded predictive LSP parameter vector $\hat{\Theta}_f$ formed of decoded values of an LSP parameter vector $\Theta_f$ by adding the decoded differential vector $\hat{S}_f$ and a prediction vector containing at least a prediction based on a past frame (s420) and outputs the decoded predictive LSP parameter vector $\hat{\Theta}_f$. If necessary, the predictive decoding unit 420 further converts the decoded predictive LSP parameter vector $\hat{\Theta}_f$ into decoded predictive linear prediction coefficients $\hat{a}_f[1], \hat{a}_f[2], \ldots, \hat{a}_f[p]$ and outputs the decoded predictive linear prediction coefficients $\hat{a}_f[1], \hat{a}_f[2], \ldots, \hat{a}_f[p]$.

In the present embodiment, the prediction vector is a vector $V+\alpha\times\hat{S}_{f-1}$ obtained by adding the predetermined predictive mean vector V and what is obtained by multiplying the decoded differential vector $\hat{S}_{f-1}$ of a past frame by a factor of $\alpha$.

<Vector Codebook 402>

In the vector codebook 402, candidate differential vectors and differential vector codes corresponding to the candidate differential vectors are stored in advance. Incidentally, the vector codebook 402 shares information in common with the vector codebook 306 of the above-described linear prediction coefficient coding device 300.

<Vector Decoding Unit 401>

The vector decoding unit 401 receives the LSP code $C_f$, decodes the LSP code $C_f$, obtains a decoded differential vector $\hat{S}_f$ corresponding to the LSP code $C_f$, and outputs the decoded differential vector $\hat{S}_f$. For decoding of the LSP code $C_f$, a decoding method corresponding to the coding method of the vector coding unit 304 of the coding device is used.

Here, an example of a case in which a decoding method corresponding to the method adopted by the vector coding unit 304, the method of vector quantizing the differential vector $S_f$, is used will be described. The vector decoding unit 401 searches for a differential vector code corresponding to the LSP code $C_f$ from a plurality of differential vector codes stored in the vector codebook 402 and outputs a candidate differential vector corresponding to the differential vector code as the decoded differential vector $\hat{S}_f$ (s401). Incidentally, the decoded differential vector $\hat{S}_f$ corresponds to the quantization differential vector $\hat{S}_f$ which the above-described vector coding unit 304 outputs and takes the same values as the quantization differential vector $\hat{S}_f$ if there are no transmission errors and no errors and the like in the course of coding and decoding.

<Delay Input Unit 403>

The delay input unit 403 receives the decoded differential vector $\hat{S}_f$, holds the decoded differential vector $\hat{S}_f$, delays the decoded differential vector $\hat{S}_f$ by one frame, and outputs the resultant vector as a preceding-frame decoded differential vector $\hat{S}_{f-1}$ (s403). That is, if the predictive addition unit 405 performs processing on a decoded differential vector $\hat{S}_f$ of an fth frame, the delay input unit 403 outputs a decoded differential vector $\hat{S}_{f-1}$ of an f−1th frame.

<Predictive Addition Unit 405>

The predictive addition unit 405 is formed of, for example, a storage 405c storing a predetermined coefficient $\alpha$, a storage 405d storing a predictive mean vector V, a multiplication unit 404, and addition units 405a and 405b.

The predictive addition unit 405 receives the decoded differential vector $\hat{S}_f$ of the present frame and the preceding-frame decoded differential vector $\hat{S}_{f-1}$.

The predictive addition unit 405 generates a decoded predictive LSP parameter vector $\hat{\Theta}_f(=\hat{S}_f+V+\alpha\hat{S}_{f-1})=\hat{\theta}_f[1], \hat{\theta}_f[2], \ldots, \hat{\theta}_f[p]$ that is a vector obtained by adding the decoded differential vector $\hat{S}_f$, the predictive mean vector $V=(v[1], v[2], \ldots, v[N])^T$, and a vector $\alpha\times\hat{S}_{f-1}$ (s405) and outputs the decoded predictive LSP parameter vector $\hat{\Theta}_f$.

The multiplication unit 404 obtains the vector $\alpha\times\hat{S}_{f-1}$ by multiplying the preceding-frame decoded differential vector $\hat{S}_{f-1}$ by the predetermined coefficient $\alpha$ stored in the storage 405c.

In FIG. 12, by using the two addition units 405a and 405b, first, after the vector $\alpha\times\hat{S}_{f-1}$ is added to the decoded differential vector $\hat{S}_f$ of the present frame in the addition unit 405a, the predictive mean vector V is added in the addition unit 405b, but the above may be performed the other way around. Alternatively, the decoded predictive LSP parameter vector $\hat{\Theta}_f$ may be generated by adding a vector obtained by adding the vector $\alpha\times\hat{S}_{f-1}$ and the predictive mean vector V to the decoded differential vector $\hat{S}_f$.

Incidentally, it is assumed that the predictive mean vector V used here is the same as the predictive mean vector V used in the predictive coding unit 320 of the above-described linear prediction coefficient coding device 300.

<Predictive Linear Prediction Coefficient Calculation Unit 406>

The predictive linear prediction coefficient calculation unit 406 receives the decoded predictive LSP parameter vector $\hat{\Theta}_f=(\hat{\theta}_f[1], \hat{\theta}_f[2], \ldots, \hat{\theta}_f[p])$, converts the decoded predictive LSP parameter vector $\hat{\Theta}_f=(\hat{\theta}_f[1], \hat{\theta}_f[2], \ldots, \hat{\theta}_f[p])$ into decoded predictive linear prediction coefficients $\hat{a}_f[1], \hat{a}_f[2], \ldots, \hat{a}_f[p]$ (s406), and outputs the decoded predictive linear prediction coefficients $\hat{a}_f[1], \hat{a}_f[2], \ldots, \hat{a}_f[p]$.

<Non-Predictive Decoding Unit 410>

The non-predictive decoding unit 410 includes a correction vector codebook 412, a correction vector decoding unit 411, a non-predictive addition unit 413, and an index calculation unit 415, and, when necessary, also includes a non-predictive linear prediction coefficient calculation unit 414. The index calculation unit 415 corresponds to the index calculation unit 205 of the first embodiment.

To the non-predictive decoding unit 410, the correction LSP code $D_f$, the decoded differential vector $\hat{S}_f$, and the decoded predictive LSP parameter vector $\hat{\Theta}_f$ are input. The non-predictive decoding unit 410 obtains a decoded correction vector $\hat{U}_f$ by decoding the correction LSP code $D_f$. Furthermore, the non-predictive decoding unit 410 generates a decoded non-predictive LSP parameter vector $\hat{\Phi}_f=(\hat{\phi}_f[1], \hat{\phi}_f[2], \ldots, \hat{\phi}_f[p])$ formed of decoded values of LSP parameters of the present frame by adding at least the decoded differential vector $\hat{S}_f$ to the decoded correction vector $\hat{U}_f$ (s410) and outputs the decoded non-predictive LSP parameter vector $\hat{\Phi}_f$. Here, the decoded differential vector $\hat{S}_f$ is a prediction vector containing at least a prediction based on a past frame. If necessary, the non-predictive decoding unit 410 further converts the decoded non-predictive LSP parameter vector $\hat{\Phi}_f=(\hat{\phi}_f[1], \hat{\phi}_f[2], \ldots, \hat{\phi}_f[p])$ into decoded non-predictive linear prediction coefficients $\hat{b}_f[1], \hat{b}_f[2], \ldots, \hat{b}_f[p]$ (s410) and outputs the decoded non-predictive linear prediction coefficients $\hat{b}_f[1], \hat{b}_f[2], \ldots, \hat{b}_f[p]$.

Hereinafter, the details of processing of each unit will be described.

<Index Calculation Unit 415>

The index calculation unit 415 receives the decoded predictive LSP parameter vector $\hat{\Theta}_f$ and calculates an index Q commensurate with how high the peak-to-valley height of a spectral envelope corresponding to the decoded predictive LSP parameter vector $\hat{\Theta}_f=(\hat{\theta}_f[1], \hat{}_f[2], \ldots, \hat{\theta}_f[p])^T$, that is, the index Q which increases with an increase in the peak-to-valley of the spectral envelope and/or an index Q' commensurate with how short the peak-to-valley height of the spectral envelope is, that is, the index Q' which decreases with an increase in the peak-to-valley of the spectral envelope (s415). In accordance with the magnitude of the index Q and/or Q', the index calculation unit 415 outputs, to the correction vector decoding unit 411 and the non-predictive addition unit 413, a control signal C indicating that correction decoding processing is performed/not performed or a control signal C indicating that correction decoding processing is performed using a predetermined bit number. The indices Q and Q' are similar to those in the description of the index calculation unit 205 and simply have to be calculated in a similar manner by using the decoded predictive LSP parameters $\hat{\theta}_f[1], \hat{\theta}_f[2], \ldots, \hat{\theta}_f[p]$ which are the elements of the decoded predictive LSP parameter vector $\hat{\Theta}_f$ in place of the decoded LSP parameters $\hat{\theta}_f[1], \hat{\theta}_f[2], \ldots, \hat{\theta}_f[p]$.

If the peak-to-valley of the spectral envelope is above the predetermined standard, that is, in the above-described example, if (A−1) the index Q is larger than or equal to the predetermined threshold value Th1 and/or (B−1) the index Q' is smaller than or equal to the predetermined threshold value Th1', the index calculation unit 415 outputs, to the non-predictive addition unit 413 and the correction vector decoding unit 411, the control signal C indicating that correction decoding processing is performed; otherwise, the index calculation unit 415 outputs, to the non-predictive addition unit 413 and the correction vector decoding unit 411, the control signal C indicating that correction decoding processing is not performed.

Moreover, the index calculation unit 415 may be configured such that the index calculation unit 415 outputs a positive integer (or a code representing a positive integer) representing a predetermined bit number as the control signal C in the case of (A−1) and/or (B−1); otherwise, the index calculation unit 415 outputs 0 as the control signal C.

Incidentally, when the correction vector decoding unit 411 and the non-predictive addition unit 413 are configured so as to determine to perform correction decoding processing if the correction vector decoding unit 411 and the non-predictive addition unit 413 receive the control signal C, the index calculation unit 415 may be configured so as not to output the control signal C in cases other than the case (A−1) and/or (B−1).

<Correction Vector Codebook 412>

The correction vector codebook 412 stores the information with the same contents as those of the correction vector codebook 313 in the linear prediction coefficient coding device 300. That is, in the correction vector codebook 412, candidate correction vectors and correction vector codes corresponding to the candidate correction vectors are stored.

<Correction Vector Decoding Unit 411>

The correction vector decoding unit 411 receives the correction LSP code $D_f$ and the control signal C. If the correction vector decoding unit 411 receives the control signal C indicating that correction decoding processing is performed or a positive integer (or a code representing a positive integer) as the control signal C, in a word, if the peak-to-valley of the spectral envelope is above the predetermined standard, that is, in the above-described example, in the case of (A−1) and/or (B−1), the correction vector decoding unit 411 obtains a decoded correction vector $\hat{U}_f$ by decoding the correction LSP code $D_f$ (s411) and outputs the decoded correction vector $\hat{U}_f$. For example, the correction vector decoding unit 411 searches for a correction vector code corresponding to the correction LSP code $D_f$ from a plurality of correction vector codes stored in the correction vector codebook 412 and outputs a candidate correction vector corresponding to the correction vector code obtained by the search as the decoded correction vector $\hat{U}_f$.

If the correction vector decoding unit 411 receives the control signal C indicating that correction decoding processing is not performed or 0 as the control signal C, in a word, if the peak-to-valley of the spectral envelope is not above the predetermined standard, that is, in the above-described example, in cases other than the case (A−1) and/or (B−1), the correction vector decoding unit 411 does not decode the correction LSP code $D_f$ and does not obtain and output a decoded correction vector $\hat{U}_f$.

<Non-Predictive Addition Unit 413>

The non-predictive addition unit 413 is formed of, for example, a storage 413c storing a non-predictive mean vector $Y=(y[1], y[2], \ldots, y[p])^T$ and addition units 413a and 413b.

The non-predictive addition unit 413 receives the control signal C and the decoded differential vector $\hat{S}_f$. If the non-predictive addition unit 413 receives the control signal C indicating that correction decoding processing is performed or a positive integer (or a code representing a positive integer) as the control signal C, in a word, if the peak-to-valley of the spectral envelope is above the predetermined standard, in the case of (A−1) and/or (B−1), the non-predictive addition unit 413 further receives the decoded correction vector $\hat{U}_f$. Then, the non-predictive addition unit 413 generates a decoded non-predictive LSP parameter vector $\hat{\Phi}_f=\hat{U}_f+Y+\hat{S}_f$ obtained by adding the decoded correction vector $\hat{U}_f$, the decoded differential vector $\hat{S}_f$, and the non-predictive mean vector Y (s413) and outputs the decoded non-predictive LSP parameter vector $\hat{\Phi}_f$. Incidentally, in FIG. 10, by using the two addition units 413a and 413b, first, after the decoded differential vector $\hat{S}_f$ is added to the decoded correction vector $\hat{U}_f$ in the addition unit 413a, the non-predictive mean vector Y stored in the storage 413c is added in the addition unit 413b, but these additions may be performed the other way around. Alternatively, the decoded non-predictive LSP parameter vector $\hat{\Phi}_f$ may be generated by adding a vector obtained by adding the non-predictive mean vector Y and the decoded differential vector $\hat{S}_f$ to the decoded correction vector $\hat{U}_f$.

If the non-predictive addition unit 413 receives the control signal C indicating that the correction vector decoding unit 411 does not perform correction decoding processing or 0 as the control signal C, in a word, if the peak-to-valley of the spectral envelope is not above the predetermined standard, that is, in the above-described example, in cases other than the case (A−1) and/or (B−1), the non-predictive addition unit 413 does not receive the decoded correction vector $\hat{U}_f$. Then, the non-predictive addition unit 413 generates a decoded non-predictive LSP parameter vector $\hat{\Phi}_f=Y+\hat{S}_f$ obtained by adding the decoded differential vector $\hat{S}_f$ and the non-predictive mean vector Y (s413) and outputs the decoded non-predictive LSP parameter vector $\hat{\Phi}_f$.

<Non-Predictive Linear Prediction Coefficient Calculation Unit 414>

The non-predictive linear prediction coefficient calculation unit 414 receives the decoded non-predictive LSP parameter vector $\hat{\Phi}_f=(\hat{\phi}_f[1], \hat{\phi}_f[2], \ldots, \hat{\phi}_f[p])$, converts the decoded non-predictive LSP parameter vector $\hat{\Phi}_f=(\hat{\phi}_f[1], \hat{\phi}_f[2], \ldots, \hat{\phi}_f[p])$ into decoded non-predictive linear prediction coefficients $\hat{b}_f[1], \hat{b}_f[2], \ldots, \hat{b}_f[p]$ (s414), and outputs the decoded non-predictive linear prediction coefficients $\hat{b}_f[1], \hat{b}_f[2], \ldots, \hat{b}_f[p]$.

<Effect of the Second Embodiment>

The second embodiment has a configuration in which, if the peak-to-valley height of a spectral envelope is high, what is obtained by adding, to the non-predictive mean vector Y and the decoded differential vector $\hat{S}_f$, the decoded correction vector $\hat{U}_f$ obtained by decoding the correction LSP code $D_f$ is used as the decoded non-predictive LSP parameter vector $\hat{\Phi}_f$. With such a configuration, it is possible to obtain the effect, which is similar to that of the first embodiment, of accurately coding and decoding coefficients which are convertible into linear prediction coefficients even for a frame in which the peak-to-valley height of a spectrum is high while suppressing an increase in the code amount as a whole.

Incidentally, the bit length of the correction vector code is 2-bit, and, in the correction vector codebook 313, four types of candidate correction vectors corresponding to four types of correction vector codes ("00" "01" "10" "11") are stored.

<First Modification of the Second Embodiment>

A modification similar to the first modification of the first embodiment is possible.

The LSP code $C_f$ or a code corresponding to the LSP code $C_f$ is also referred to as the first code and the predictive coding unit is also referred to as the first coding unit. Likewise, the correction LSP code $D_f$ or a code corresponding to the correction LSP code $D_f$ is also referred to as the second code, a processing unit formed of the non-predictive subtraction unit and the correction vector coding unit of the non-predictive coding unit is also referred to as the second coding unit, and a processing unit formed of the predictive addition unit and the index calculation unit of the non-predictive coding unit is also referred to as an index calculation unit. Moreover, the decoded predictive LSP parameter vector $\hat{\Theta}_f$ or a vector corresponding to the decoded predictive LSP parameter vector $\hat{\Theta}_f$ is also referred to as a first decoded vector and the predictive decoding unit is also referred to as the first decoding unit. Furthermore, the decoded non-predictive LSP parameter vector $\hat{\Phi}_f$ or a vector corresponding to the decoded non-predictive LSP parameter vector $\hat{\Phi}_f$ is also referred to as a second decoded vector and a processing unit formed of the correction vector decoding unit and the non-predictive addition unit of the non-predictive decoding unit is also referred to as the second decoding unit.

In the present embodiment, only one frame is used as a "past frame", but, if necessary, two frames or more may be used as appropriate.

Third Embodiment

Differences from the second embodiment will be mainly described.

A large number of candidate correction vectors stored in a correction vector codebook means that coding can be performed with an accordingly high accuracy of approximation. Thus, in the present embodiment, the correction vector coding unit and the correction vector decoding unit are executed by using a correction vector codebook whose accuracy is increased with an increase in the influence of a reduction in the accuracy of decoding caused by a transmission error in an LSP code.

<Linear Prediction Coefficient Coding Device 500 According to the Third Embodiment>

Figure 13:
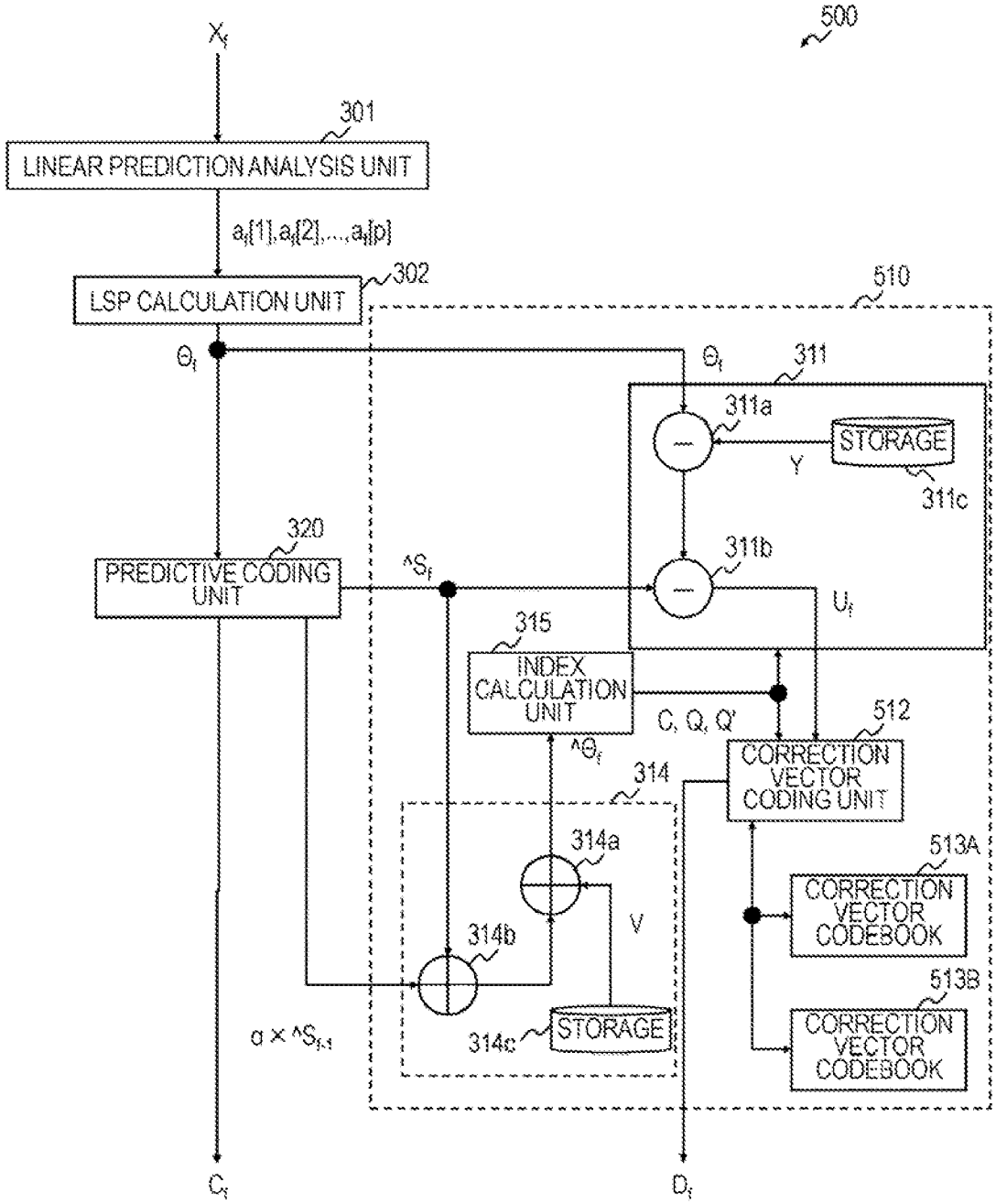
FIG. 13 is a functional block diagram of the linear prediction coefficient coding device according to the third embodiment.

FIG. 13 depicts a functional block diagram of a linear prediction coefficient coding device 500 of the third embodiment, and FIG. 8 depicts an example of the processing flow thereof.

The linear prediction coefficient coding device 500 of the third embodiment includes a non-predictive coding unit 510 in place of the non-predictive coding unit 310. As is the case with the linear prediction coefficient coding device 300 of the second embodiment, if LSP parameters θ derived from a sound signal $X_f$ are generated by another device and the input of the linear prediction coefficient coding device 500 is the LSP parameters $\theta_f[1], \theta_f[2], \ldots, \theta_f[p]$, the linear prediction coefficient coding device 500 does not have to include the linear prediction analysis unit 301 and the LSP calculation unit 302.

The non-predictive coding unit 510 includes the non-predictive subtraction unit 311, a correction vector coding unit 512, correction vector codebooks 513A and 513B, the predictive addition unit 314, and the index calculation unit 315.

The differences from the second embodiment lie in that the linear prediction coefficient coding device 500 of the third embodiment includes a plurality of correction vector codebooks and the correction vector coding unit 512 performs coding by selecting any one of the correction vector codebooks 513A and 513B in accordance with the index Q and/or Q' calculated in the index calculation unit 515.

Hereinafter, a description will be given by taking up as an example a case in which the two types of correction vector codebooks 513A and 513B are provided.

The correction vector codebooks 513A and 513B differ from each other in the total number of candidate correction vectors stored therein. A large total number of candidate correction vectors means a large bit number of a corresponding correction vector code. To put it the other way around, the larger the bit number of a correction vector code is made, the more candidate correction vectors can be prepared. For example, if the bit number of a correction vector code is assumed to be A, up to $2^A$ candidate correction vectors can be prepared.

Hereinafter, a description will be given on the assumption that the total number of candidate correction vectors stored in the correction vector codebook 513A is larger than the total number of candidate correction vectors stored in the correction vector codebook 513B. In other words, the code length (average code length) of the codes stored in the correction vector codebook 513A is larger than the code length (average code length) of the codes stored in the correction vector codebook 513B. For example, $2^A$ pairs of a correction vector code having a code length of A-bit and a candidate correction vector are stored in the correction vector codebook 513A, and $2^B$ ($2^B<2^A$) pairs of a correction vector code having a code length of B-bit (B<A) and a candidate correction vector are stored in the correction vector codebook 513B.

Incidentally, in the present embodiment, as already explained in the second modification of the first embodiment, the index calculation unit outputs the index Q and/or the index Q' in place of the control signal C, and, in accordance with the magnitude of the index Q and/or the index Q', the correction vector coding unit and the correction vector decoding unit determine what kind of coding and decoding the correction vector coding unit and the correction vector decoding unit perform, respectively. In accordance with the magnitude of the index Q and/or the index Q', the non-predictive subtraction unit 311 determines whether or not to perform subtraction processing. In accordance with the magnitude of the index Q and/or the index Q', the non-predictive addition unit 413 determines what kind of addition processing the non-predictive addition unit 413 performs. The determinations made in the non-predictive subtraction unit 311 and the non-predictive addition unit 413 are the same as those explained in the above-described index calculation unit 315 and index calculation unit 415.

However, as in the second embodiment, a configuration may be adopted in which the index calculation unit makes a determination as to what kind of coding and decoding the correction vector coding unit and the correction vector decoding unit perform, respectively, a determination as to whether or not the non-predictive subtraction unit 311 performs subtraction, and a determination as to what kind of addition processing the non-predictive addition unit 413 performs and outputs the control signal C corresponding to the determination results.

<Correction Vector Coding Unit 512>

The correction vector coding unit 512 receives the index Q and/or the index Q' and the correction vector $U_f$. The correction vector coding unit 512 obtains a correction LSP code $D_f$ whose bit number becomes greater (code length becomes larger) as (A−2) the index Q increases and/or (B−2) the index Q' decreases (s512) and outputs the correction LSP code $D_f$. For example, the correction vector coding unit 512 performs coding in the following manner by using a predetermined threshold value Th2 and/or a predetermined threshold value Th2'. Incidentally, since the correction vector coding unit 512 performs coding processing if the index Q is larger than or equal to the predetermined threshold value Th1 and/or the index Q' is smaller than or equal to the predetermined threshold value Th1', Th2 is a value greater than Th1 and Th2' is a value smaller than Th1'.

If (A−5) the index Q is larger than or equal to the predetermined threshold value Th2 and/or (B−5) the index Q' is smaller than or equal to the predetermined threshold value Th2', A which is a positive integer is assumed to be set as the bit number of the correction LSP code $D_f$, and the correction vector coding unit 512 obtains a correction LSP code $D_f$ by coding the correction vector $U_f$ by referring to the correction vector codebook 513A storing the $2^A$ pairs of a correction vector code having the bit number (code length) A and a candidate correction vector (s512) and outputs the correction LSP code $D_f$.

If (A−6) the index Q is smaller than the predetermined threshold value Th2 and the index Q is larger than or equal to the predetermined threshold value Th1 and/or (B−6) the index Q' is larger than the predetermined threshold value Th2' and the index Q' is smaller than or equal to the predetermined threshold value Th1', B which is a positive integer less than the bit number A is assumed to be set as the bit number of the correction LSP code $D_f$, and the correction vector coding unit 512 obtains a correction LSP code $D_f$ by coding the correction vector $U_f$ by referring to the correction vector codebook 513B storing the $2^B$ pairs of a correction vector code having the bit number (code length) B and a candidate correction vector (s512) and outputs the correction LSP code $D_f$.

In other cases (C−6), 0 is assumed to be set as the bit number of the correction LSP code $D_f$, and the correction vector coding unit 512 does not code the correction vector $U_f$ and does not obtain and output a correction LSP code $D_f$.

Thus, the correction vector coding unit 512 of the third embodiment is executed when the index Q calculated in the index calculation unit 315 is larger than the predetermined threshold value Th1 and/or the index Q' calculated in the index calculation unit 315 is smaller than the predetermined threshold value Th1'.

<Linear Prediction Coefficient Decoding Device 600 According to the Third Embodiment>

Figure 14:
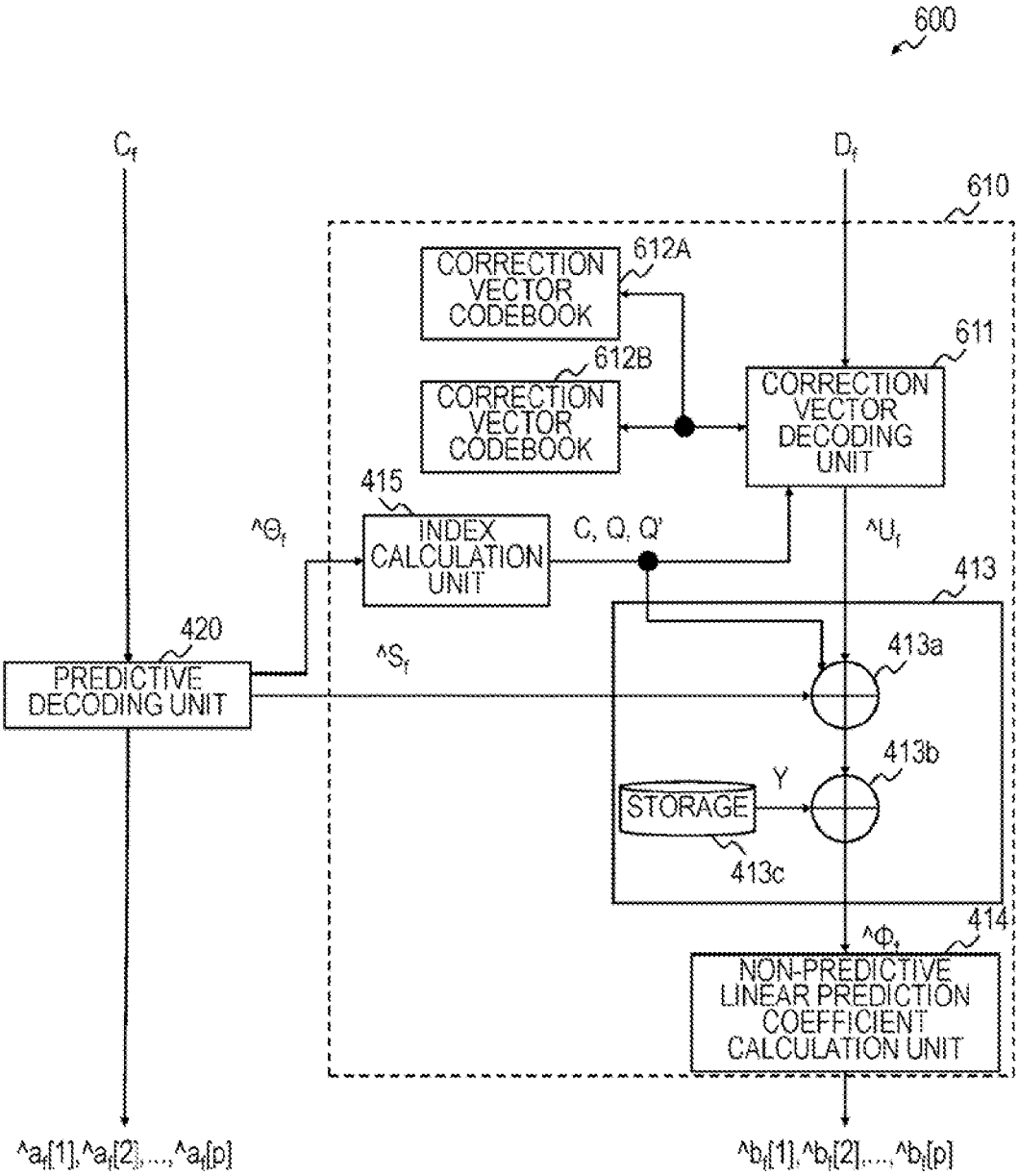
FIG. 14 is a functional block diagram of the linear prediction coefficient decoding device according to the third embodiment.

FIG. 14 depicts a functional block diagram of a linear prediction coefficient decoding device 600 according to the third embodiment, and FIG. 11 depicts an example of the processing flow thereof.

The linear prediction coefficient decoding device 600 of the third embodiment includes a non-predictive decoding unit 610 in place of the non-predictive decoding unit 410.

The non-predictive decoding unit 610 includes the non-predictive addition unit 413, a correction vector decoding unit 611, correction vector codebooks 612A and 612B, and the index calculation unit 415 and, when necessary, also includes the decoded non-predictive linear prediction coefficient calculation unit 414.

Differences from the linear prediction coefficient decoding device 400 of the second embodiment lie in that the linear prediction coefficient decoding device 600 of the third embodiment includes a plurality of correction vector codebooks and the correction vector decoding unit 611 performs decoding by selecting any one of the correction vector codebooks in accordance with the index Q and/or Q' calculated in the index calculation unit 415.

Hereinafter, a description will be given by taking up as an example a case in which the two types of correction vector codebooks 612A and 612B are provided.

The correction vector codebooks 612A and 612B store the contents shared by the correction vector codebooks 513A and 513B, respectively, of the linear prediction coefficient coding device 500. That is, in the correction vector codebooks 612A and 612B, candidate correction vectors and correction vector codes corresponding to the candidate correction vectors are stored, and the code length (average code length) of the codes stored in the correction vector codebook 612A is larger than the code length (average code length) of the codes stored in the correction vector codebook 612B. For example, $2^A$ pairs of a correction vector code having a code length of A-bit and a candidate correction vector are stored in the correction vector codebook 612A, and $2^B$ ($2^B<2^A$) pairs of a correction vector code having a code length of B-bit (B<A) and a candidate correction vector are stored in the correction vector codebook 612B.

<Correction Vector Decoding Unit 611>

The correction vector decoding unit 611 receives the index Q and/or the index Q' and the correction LSP code $D_f$. The correction vector decoding unit 611 obtains a decoded correction vector $\hat{U}_f$ from a large number of candidate correction vectors by decoding a correction LSP code $D_f$ with a bit number depending on the magnitude of the index Q and the index Q', such that (A−2) the larger the index Q and/or (B−2) the smaller the index Q', the greater the bit number (s611). For example, the correction vector decoding unit 611 performs decoding in the following manner by using a predetermined threshold value Th2 and/or Th2'. Incidentally, since the correction vector decoding unit 611 performs the decoding processing if the index Q is larger than or equal to the predetermined threshold value Th1 and/or the index Q' is smaller than or equal to the predetermined threshold value Th1', Th2 is a value greater than Th1 and Th2' is a value smaller than Th1'.

If (A–5) the index Q is larger than or equal to the predetermined threshold value Th2 and/or (B–5) the index Q' is smaller than or equal to the predetermined threshold value Th2', A which is a positive integer is assumed to be set as the bit number of the correction LSP code $D_f$, and the correction vector decoding unit 611 obtains, as a decoded correction vector $\hat{U}_f$, a candidate correction vector corresponding to a correction vector code that coincides with the correction LSP code $D_f$ by referring to the correction vector codebook 612A storing the $2^A$ pairs of a correction vector code having the bit number (code length) A and a candidate correction vector (s611) and outputs the decoded correction vector $\hat{U}_f$.

If (A–6) the index Q is smaller than the predetermined threshold value Th2 and the index Q is larger than or equal to the predetermined threshold value Th1 and/or (B–6) the index Q' is larger than the predetermined threshold value Th2' and the index Q' is smaller than or equal to the predetermined threshold value Th1', B which is a positive integer less than the bit number A is assumed to be set as the bit number of the correction LSP code $D_f$, and the correction vector decoding unit 611 obtains, as a decoded correction vector $\hat{U}_f$, a candidate correction vector corresponding to a correction vector code that coincides with the correction LSP code $D_f$ by referring to the correction vector codebook 612B storing the $2^B$ pairs of a correction vector code having the bit number (code length) B and a candidate correction vector (s611) and outputs the decoded correction vector $\hat{U}_f$.

In other cases (C–6), 0 is assumed to be set as the bit number of the correction LSP code $D_f$, and the correction vector decoding unit 611 does not decode the correction LSP code $D_f$ and does not generate a decoded correction vector $\hat{U}_f$.

Thus, the correction vector decoding unit 611 of the third embodiment is executed if the index Q calculated in the index calculation unit 415 is larger than the predetermined threshold value Th1 and/or the index Q' calculated in the index calculation unit 415 is smaller than the predetermined threshold value Th1'.

<Effect of the Third Embodiment>

With such a configuration, it is possible to obtain the effect similar to that of the second embodiment. Furthermore, by changing the accuracy of coding of coefficients which are convertible into linear prediction coefficients depending on the magnitude of the variation in a spectrum, it is possible to perform coding and decoding processing of higher accuracy while suppressing an increase in the code amount as a whole.

<First Modification of the Third Embodiment>

The number of correction vector codebooks does not necessarily have to be two and may be three or more. The bit number (code length) of stored correction vector codes differs from correction vector codebook to correction vector codebook, and correction vectors corresponding to the correction vector codes are stored. It is necessary simply to set a threshold value depending on the number of correction vector codebooks. A threshold value for the index Q simply has to be set in such a way that the greater the value of the threshold value becomes, the greater the bit number of a correction vector code becomes, the correction vector code which is stored in the correction vector codebook that is used if the index Q is larger than or equal to that threshold value. Likewise, a threshold value for the index Q' simply has to be set in such a way that the smaller the value of the threshold value becomes, the greater the bit number of a correction vector code becomes, the correction vector code which is stored in the correction vector codebook that is used if the index Q' is smaller than or equal to that threshold value. With such a configuration, it is possible to perform coding and decoding processing of higher accuracy while suppressing an increase in the code amount as a whole.

<First Modification of All the Embodiments>

In the above first to third embodiments, only an LSP parameter (a low-order LSP parameter) whose order is lower than or equal to a predetermined order $T_L$ lower than a prediction order p may be set as an object on which processing (non-predictive coding processing) is to be performed, the processing being performed in the correction coding unit 108 and the addition unit 109 of FIG. 3 and the non-predictive coding units 310 and 510 of FIGS. 7 and 13, and processing corresponding to those described above may be performed also on the decoding side.

First, modifications to the coding device 100 and the decoding device 200 of the first embodiment will be described.

<Correction Coding Unit 108>

If the correction coding unit 108 receives the control signal C indicating that correction coding processing is performed or a positive integer (or a code representing a positive integer) as the control signal C, in a word, if the peak-to-valley of the spectral envelope is above the predetermined standard, that is, in the above-described example, in the case of (A–1) and/or (B–1), the correction coding unit 108 obtains a correction LSP code $CL2_f$ by coding low-order quantization errors of the quantization errors of the LSP coding unit 63, that is, $\theta_f[1]-\hat{\theta}_f[1]$, $\theta_f[2]-\hat{\theta}_f[2]$, . . . , $\theta_f[T_L]-\hat{\theta}_f[T_L]$ which are differentials between low-order LSP parameters $\theta_f[1]$, $\theta_f[2]$, . . . , $\theta_f[T_L]$, which are LSP parameters whose orders are lower than or equal to the order $T_L$, of the input LSP parameters $\theta_f[1]$, $\theta_f[2]$, . . . , $\theta_f[p]$ and low-order quantization LSP parameters $\hat{\theta}_f[1]$, $\hat{\theta}_f[2]$, . . . , $\hat{\theta}_f[T_L]$, which are quantization LSP parameters whose orders are lower than or equal to the order $T_L$, of the input quantization LSP parameters $\hat{\theta}_f[1]$, $\hat{\theta}_f[2]$, . . . , $\hat{\theta}_f[p]$, the differentials between the low-order LSP parameters $\theta_f[1]$, $\theta_f[2]$, . . . , $\theta_f[T_L]$ and the low-order quantization LSP parameters $\hat{\theta}_f[1]$, $\hat{\theta}_f[2]$, . . . , $\hat{\theta}_f[T_L]$ of corresponding orders, and outputs the correction LSP code $CL2_f$. Moreover, the correction coding unit 108 obtains low-order quantization LSP parameter differential values $\hat{\theta}diff_f[1]$, $\hat{\theta}diff_f[2]$, . . . , $\hat{\theta}diff_f[T_L]$ corresponding to the correction LSP code $CL2_f$ and outputs the low-order quantization LSP parameter differential values $\hat{\theta}diff_f[1]$, $\hat{\theta}diff_f[2]$, . . . , $\hat{\theta}diff_f[T_L]$.

If the correction coding unit 108 receives the control signal C indicating that correction coding processing is not performed or 0 as the control signal C, in a word, if the peak-to-valley of the spectral envelope is not above the predetermined standard, that is, in the above-described example, in cases other than the case (A–1) and/or (B–1), the correction coding unit 108 does not perform coding of $\theta_f[1]-\hat{\theta}_f[1]$, $\theta_f[2]-\hat{\theta}_f[2]$, . . . , $\theta_f[T_L]-\hat{\theta}_f[T_L]$ and does not output a correction LSP code $CL2_f$ and low-order quantization LSP parameter differential values $\hat{\theta}diff_f[1]$, $\hat{\theta}diff_f[2]$, . . . , $\hat{\theta}diff_f[T_L]$.

<Addition Unit 109>

If the addition unit 109 receives the control signal C indicating that correction coding processing is performed or a positive integer (or a code representing a positive integer) as the control signal C, in a word, if the peak-to-valley of the spectral envelope is above the predetermined standard, that is, in the above-described example, in the case of (A–1)

and/or (B−1), the addition unit 109 outputs, for each order which is lower than or equal to the order $T_L$, $\hat{\theta}_f[1]+\hat{\theta}diff_f[1]$, $\hat{\theta}_f[2]+\hat{\theta}diff_f[2]$, . . . , $\hat{\theta}_f[T_L]+\hat{\theta}diff_f[T_L]$ obtained by adding the quantization LSP parameters $\hat{\theta}_f[1]$, $\hat{\theta}_f[2]$, . . . , $\hat{\theta}_f[T_L]$ and the quantization LSP parameter differential values $\hat{\theta}diff_f[1]$, $\hat{\theta}diff_f[2]$, . . . , $\hat{\theta}diff_f[T_L]$ as quantization LSP parameters $\theta_f[1]$, $\theta_f[2]$, . . . , $\theta_f[T_L]$ which are used in the coefficient conversion unit 64 and outputs, for each order which is lower than or equal to the order p but higher than the order the received quantization LSP parameters without change as quantization LSP parameters $\hat{\theta}_f[T_L+1]$, $\hat{\theta}_f[T_L+2]$, . . . , $\hat{\theta}_f[p]$ which are used in the coefficient conversion unit 64.

If the addition unit 109 receives the control signal C indicating that correction coding processing is not performed or 0 as the control signal C, in a word, if the peak-to-valley of the spectral envelope is not above the predetermined standard, that is, in the above-described example, in cases other than the case (A−1) and/or (B−1), the addition unit 109 outputs the received quantization LSP parameters $\hat{\theta}_f[1]$, $\hat{\theta}_f[2]$, . . . , $\hat{\theta}_f[p]$ to the coefficient conversion unit 64 without change.

<Correction Decoding Unit 206>

The correction decoding unit 206 receives the correction LSP code $CL2_f$, obtains decoded low-order LSP parameter differential values $\hat{\theta}diff_f[1]$, $\hat{\theta}diff_f[2]$, . . . , $\hat{\theta}diff_f[T_L]$ by decoding the correction LSP code $CL2_f$, and outputs the decoded low-order LSP parameter differential values $\hat{\theta}diff_f[1]$, $\hat{\theta}diff_f[2]$, . . . , $\hat{\theta}diff_f[T_L]$.

<Addition Unit 207>

If the addition unit 207 receives the control signal C indicating that correction decoding processing is performed or a positive integer (or a code representing a positive integer) as the control signal C, in a word, if the peak-to-valley of a spectral envelope determined by the decoded LSP parameters $\hat{}_f[1]$, $\hat{\theta}_f[2]$, . . . , $\hat{\theta}_f[p]$ is above the predetermined standard, that is, in the above-described example, in the case of (A−1) and/or (B−1), the addition unit 207 outputs, for each order which is lower than or equal to the order $T_L$, $\hat{\theta}_f[1]+\hat{\theta}diff_f[1]$, $\hat{\theta}_f[2]+\hat{\theta}diff_f[2]$, . . . , $\hat{\theta}_f[T_L]+\hat{\theta}diff_f[T_L]$ obtained by adding the decoded LSP parameters $\hat{\theta}_f[1]$, $\hat{\theta}_f[2]$, . . . , $\hat{\theta}_f[T_L]$ and the decoded LSP parameter differential values $\hat{\theta}diff_f[1]$, $\hat{\theta}diff_f[2]$, . . . , $\hat{\theta}diff_f[T_L]$ as decoded LSP parameters $\hat{\theta}_f[1]$, $\hat{\theta}_f[2]$, . . . , $\hat{\theta}_f[T_L]$ which are used in the coefficient conversion unit 73 and outputs, for each order which is lower than or equal to the order p but higher than the order $T_L$, the received decoded LSP parameters $\hat{\theta}_f[T_L+1]$, $\hat{\theta}_f[T_L+2]$, . . . , $\hat{\theta}_f[p]$ to the coefficient conversion unit 73 without change.

If the addition unit 207 receives the control signal C indicating that correction decoding processing is not performed or 0 as the control signal C, in a word, if the peak-to-valley of the spectral envelope determined by the decoded LSP parameters $\hat{\theta}_f[1]$, $\hat{\theta}_f[2]$, . . . , $\hat{\theta}_f[p]$ is not above the predetermined standard, that is, in the above-described example, in cases other than (A−1) and/or (B−1), the addition unit 207 outputs the received decoded LSP parameters $\hat{\theta}_f[1]$, $\hat{\theta}_f[2]$, . . . , $\hat{\theta}_f[p]$ to the coefficient conversion unit 73 without change.

Next, modifications to the linear prediction coefficient coding devices 300 and 500 and the linear prediction coefficient decoding devices 400 and 600 of the second embodiment and the third embodiment will be described.

<Non-Predictive Subtraction Unit 311>

If the non-predictive subtraction unit 311 receives the control signal C indicating that correction coding processing is performed or a positive integer (or a code representing a positive integer) as the control signal C, in a word, if the peak-to-valley of the spectral envelope is above the predetermined standard, that is, in the above-described example, in the case of (A−1) and/or (B−1), the non-predictive subtraction unit 311 generates a low-order correction vector $U'_f=\Theta'_f-Y'-\hat{S}'_f$ that is a vector obtained by subtracting a non-predictive low-order mean vector $Y'=(y[1], y[2], \ldots, y[T_L])^T$ stored in the storage 311c and a low-order quantization differential vector $\hat{S}'_f=(\hat{s}_f[1], \hat{s}_f[2], \ldots, \hat{s}_f[T_L])^T$ formed of elements, whose orders are lower than or equal to the order $T_L$, of the input quantization differential vector $\hat{S}_f=(\hat{s}_f[1], \hat{s}_f[2], \ldots, \hat{s}_f[p])_T$ from a low-order LSP parameter vector $\Theta'_f=(\theta_f[1], \theta_f[2], \ldots, \theta_f[T_L])^T$ formed of LSP parameters, whose orders are lower than or equal to the order $T_L$, of the input LSP parameter vector $\Theta_f=(\theta_f[1], \theta_f[2], \ldots, \theta_f[p])^T$ and outputs the low-order correction vector $U'_f$. That is, the non-predictive subtraction unit 311 generates a low-order correction vector $U'_f$ that is a vector formed of some of the elements of the correction vector $U_f$ and outputs the low-order correction vector $U'_f$.

Here, the non-predictive low-order mean vector $Y'=(y[1], y[2], \ldots, y[T_L])^T$ is a predetermined vector and is a vector formed of elements, whose orders are lower than or equal to the order $T_L$, of the non-predictive mean vector $Y=(y[1], y[2], \ldots, y[p])^T$ which is used in the decoding device.

Incidentally, a low-order LSP parameter vector $\Theta'_f$ formed of LSP parameters, whose orders are lower than or equal to the order $T_L$, of the LSP parameter vector $\Theta_f$ may be output from the LSP calculation unit 302 and input to the non-predictive subtraction unit 311. Moreover, a low-order quantization differential vector $\hat{S}'_f$ formed of elements, whose orders are lower than or equal to the order $T_L$, of the quantization differential vector $\hat{S}_f$ may be output from the vector coding unit 304 and input to the non-predictive subtraction unit 311.

If the non-predictive subtraction unit 311 receives the control signal C indicating that correction coding processing is not performed or 0 as the control signal C, in a word, if the peak-to-valley of the spectral envelope is not above the predetermined standard, that is, in the above-described example, in cases other than the case (A−1) and/or (B−1), the non-predictive subtraction unit 311 does not have to generate a low-order correction vector $U'_f$.

<Correction Vector Coding Units 312 and 512>

The correction vector coding units 312 and 512 obtain a correction LSP code $D_f$ by coding the low-order correction vector $U'_f$ that is a vector formed of some of the elements of the correction vector $U_f$ by referring to the correction vector codebooks 313, 513A, and 513B and output the correction LSP code $D_f$. The candidate correction vectors that are stored in the correction vector codebooks 313, 513A, and 513B simply have to be vectors of the order $T_L$.

<Correction Vector Decoding Units 411 and 611>

The correction vector decoding units 411 and 611 receive the correction LSP code $D_f$, obtain a decoded low-order correction vector $\hat{U}'_f$ by decoding the correction LSP code $D_f$ by referring to the correction vector codebooks 412, 612A, and 612B, and output the decoded low-order correction vector $\hat{U}'_f$. The decoded low-order correction vector $\hat{U}'_f=(u_f[1], u_f[2], \ldots, u_f[T_L])^T$ is a vector of the order $T_L$. As is the case with the correction vector codebooks 313, 513A, and 513B, the candidate correction vectors that are stored in the correction vector codebooks 412, 612A, and 612B simply have to be vectors of the order $T_L$.

<Non-Predictive Addition Unit 413>

The non-predictive addition unit 413 receives the control signal C and the decoded differential vector $\hat{S}_f=(\hat{s}_f[1], \hat{s}_f[2], \ldots, \hat{s}_f[p])^T$.

If the non-predictive addition unit 413 receives the control signal C indicating that correction decoding processing is performed or a positive integer (or a code representing a positive integer) as the control signal C, in a word, if the peak-to-valley of the spectral envelope is above the predetermined standard, in the case of (A−1) and/or (B−1), the non-predictive addition unit 413 further receives the decoded low-order correction vector $\hat{U}'_f$. Then, the non-predictive addition unit 413 generates a decoded non-predictive LSP parameter vector $\hat{\Phi}_f$ obtained by adding, for each order which is lower than or equal to the order $T_L$, elements of the decoded low-order correction vector $\hat{U}'_f$, the decoded differential vector $\hat{S}_f$, and the non-predictive mean vector Y and adding, for each order which is lower than or equal to the order p but higher than the order $T_L$, elements of the decoded differential vector $\hat{S}_f$ and the non-predictive mean vector Y and outputs the decoded non-predictive LSP parameter vector $\hat{\Phi}_f$. That is, the decoded non-predictive LSP parameter vector $\hat{\Phi}_f$ is $\hat{\Phi}_f=(u_f[1]+y[1]+\hat{s}_f[1], u_f[2]+y[2]+\hat{s}_f[2], \ldots, u_f[T_L]+y[T_L]+\hat{s}_f[T_L], y[T_L+1]+\hat{s}_f[T_L+1], \ldots, y[p]+\hat{s}_f[p])$.

If the non-predictive addition unit 413 receives the control signal C indicating that correction decoding processing is not performed or 0 as the control signal C, in a word, if the peak-to-valley of the spectral envelope is not above the predetermined standard, that is, in the above-described example, in cases other than the case (A−1) and/or (B−1), the non-predictive addition unit 413 does not receive the decoded low-order correction vector $\hat{U}'_f$. Then, the non-predictive addition unit 413 generates a decoded non-predictive LSP parameter vector $\hat{\Phi}_f=Y+\hat{S}_f$ obtained by adding the decoded differential vector $\hat{S}_f$ and the non-predictive mean vector Y and outputs the decoded non-predictive LSP parameter vector $\hat{\Phi}_f$.

As a result, by preferentially reducing coding distortion of a low-order LSP parameter, it is possible to suppress an increase in the code amount as compared to the methods of the first to third embodiments while suppressing an increase in distortion.

<Second Modification of All the Embodiments>

In the first to third embodiments, the linear prediction coefficients $a_f[1], a_f[2], \ldots, a_f[p]$ are used as the input of the LSP calculation unit; for example, a series of coefficients $a_f[1]\times\gamma, a_f[2]\times\gamma^2, \ldots, a_f[p]\times\gamma^p$ obtained by multiplying each coefficient $a_f[i]$ of the linear prediction coefficients by γ raised to the ith power may be used as the input of the LSP calculation unit.

Moreover, in the first to third embodiments, an object to be coded and decoded is assumed to be an LSP parameter, but a linear prediction coefficient itself or any coefficient such as an ISP parameter may be used as an object to be coded and decoded as long as the coefficient is a coefficient which is convertible into a linear prediction coefficient.

<Other Modifications>

The present invention is not limited to the above-described embodiments and modifications. For example, the above-described various kinds of processing may be performed, in addition to being performed in chronological order in accordance with the description, concurrently or individually depending on the processing power of a device that performs the processing or when needed. Other changes may be made as appropriate without departing from the spirit of the present invention.

<Program and Recording Medium>

Moreover, various kinds of processing functions of the devices described in the above-described embodiments and modifications may be implemented by a computer. In that case, the processing details of the functions supposed to be provided in the devices are described by a program. As a result of this program being executed by the computer, the various kinds of processing functions of the above-described devices are implemented on the computer.

The program describing the processing details can be recorded on a computer-readable recording medium. As the computer-readable recording medium, for example, any one of a magnetic recording device, an optical disk, a magneto-optical recording medium, semiconductor memory, and so forth may be used.

Moreover, the distribution of this program is performed by, for example, selling, transferring, or lending a portable recording medium such as a DVD or a CD-ROM on which the program is recorded. Furthermore, the program may be distributed by storing the program in a storage device of a server computer and transferring the program to other computers from the server computer via a network.

The computer that executes such a program first, for example, temporarily stores the program recorded on the portable recording medium or the program transferred from the server computer in a storage thereof. Then, at the time of execution of processing, the computer reads the program stored in the storage thereof and executes the processing in accordance with the read program. Moreover, as another embodiment of this program, the computer may read the program directly from the portable recording medium and execute the processing in accordance with the program. Furthermore, every time the program is transferred to the computer from the server computer, the computer may sequentially execute the processing in accordance with the received program. In addition, a configuration may be adopted in which the transfer of a program to the computer from the server computer is not performed and the above-described processing is executed by so-called application service provider (ASP)-type service by which the processing functions are implemented only by an instruction for execution thereof and result acquisition. Incidentally, it is assumed that the program includes information (data or the like which is not a direct command to the computer but has the property of defining the processing of the computer) which is used for processing by an electronic calculator and is equivalent to a program.

Moreover, the devices are assumed to be configured as a result of a predetermined program being executed on the computer, but at least part of these processing details may be implemented on the hardware.

What is claimed is:

1. A coding device comprising:

circuitry configured to:

execute first coding processing in which the circuitry obtains a first code by coding coefficients which are convertible into linear prediction coefficients of more than one order; and execute second coding processing in which the circuitry obtains a second code by coding at least quantization errors of the first coding processing if an index Q commensurate with how high a peak-to-valley height of a spectral envelope is, the spectral envelope corresponding to the coefficients which are convertible into the linear prediction coefficients of more than one order, is larger than or equal to a predetermined threshold value Th1 and/or an index Q' commensurate with how short the peak-to-valley height of the spectral envelope is, is smaller than or equal to a predetermined threshold value Th1', wherein in the second coding processing the circuitry obtains the second code whose bit number becomes greater as the index Q increases and/or the index Q' decreases.

2. A non-transitory computer-readable recording medium having recorded thereon a program for making a computer function as the coding device according to claim 1.

3. A decoding device comprising:

circuitry configured to:

execute first decoding processing in which the circuitry obtains first decoded values by decoding a first code, the first decoded values corresponding to coefficients which are convertible into linear prediction coefficients of more than one order;

execute second decoding processing in which the circuitry obtains second decoded values of more than one order by decoding a second code if an index Q commensurate with how high a peak-to-valley height of a spectral envelope is, the spectral envelope corresponding to the first decoded values of the coefficients which are convertible into the linear prediction coefficients of more than one order, is larger than or equal to a predetermined threshold value Th1 and/or an index Q' commensurate with how short the peak-to-valley height of the spectral envelope is, is smaller than or equal to a predetermined threshold value Th1'; and execute addition processing in which the circuitry obtains third decoded values corresponding to the coefficients which are convertible into the linear prediction coefficients of more than one order by adding the first decoded values and the second decoded values of corresponding orders if the index Q commensurate with how high the peak-to-valley height of the spectral envelope is, the spectral envelope corresponding to the first decoded values of the coefficients which are convertible into the linear prediction coefficients of more than one order, is larger than or equal to the predetermined threshold value Th1 and/or the index Q' commensurate with how short the peak-to-valley height of the spectral envelope is, is smaller than or equal to the predetermined threshold value Th1', wherein in the second decoding processing the circuitry obtains the second decoded values from a large number of candidates for decoded values by decoding the second code with a bit number depending on a magnitude of the index Q and the index Q', such that the larger the index Q and/or the smaller the index Q', the greater the bit number.

4. A non-transitory computer-readable recording medium having recorded thereon a program for making a computer function as the decoding device according to claim 3.

5. A coding method, implemented by a coding device that includes circuitry, comprising:

a first coding step in which the circuitry obtains a first code by coding coefficients which are convertible into linear prediction coefficients of more than one order; and a second coding step in which the circuitry obtains a second code by coding at least quantization errors of the first coding step [if] *when* an index Q commensurate with how high a peak-to-valley height of a spectral envelope is, the spectral envelope corresponding to the coefficients which are convertible into the linear prediction coefficients of more than one order, is larger than or equal to a predetermined threshold value Th1 and/or an index Q' commensurate with how short the peak-to-valley height of the spectral envelope is, is smaller than or equal to a predetermined threshold value Th1', wherein in the second coding step the circuitry obtains the second code whose bit number becomes greater as the index Q increases and/or the index Q' decreases.

6. A decoding method, implemented by a decoding device that includes circuitry, comprising:

a first decoding step in which the circuitry obtains first decoded values by decoding a first code, the first decoded values corresponding to coefficients which are convertible into linear prediction coefficients of more than one order;

a second decoding step in which the circuitry obtains second decoded values of more than one order by decoding a second code [if] *when* an index Q commensurate with how high a peak-to-valley height of a spectral envelope is, the spectral envelope corresponding to the first decoded values of the coefficients which are convertible into the linear prediction coefficients of more than one order, is larger than or equal to a predetermined threshold value Th1 and/or an index Q' commensurate with how short the peak-to-valley height of the spectral envelope is, is smaller than or equal to a predetermined threshold value Th1'; and an addition step in which the circuitry obtains third decoded values corresponding to the coefficients which are convertible into the linear prediction coefficients of more than one order by adding the first decoded values and the second decoded values of corresponding orders [if] *when* the index Q commensurate with how high the peak-to-valley height of the spectral envelope is, the spectral envelope corresponding to the first decoded values of the coefficients which are convertible into the linear prediction coefficients of more than one order, is larger than or equal to the predetermined threshold value Th1 and/or the index Q' commensurate with how short the peak-to-valley height of the spectral envelope is, is smaller than or equal to the predetermined threshold value Th1', wherein in the second decoding step the circuitry obtains the second decoded values from a large number of candidates for decoded values by decoding the second code with a bit number depending on a magnitude of the index Q and the index Q', such that the larger the index Q and/or the smaller the index Q', the greater the bit number.

*7. A coding device comprising:*

*circuitry configured to:*

*execute first coding processing in which the circuitry obtains a first code by coding line spectrum pair parameters of more than one order; and*

*execute second coding processing in which the circuitry obtains a second code by coding at least quantization errors of the first coding processing if a minimum value of differentials between adjacent parameters of quantized line spectrum pair parameters of all orders or low orders corresponding to the first code and a lowest-order quantized line spectrum pair parameter is smaller than or equal to a predetermined threshold value Th1', wherein the quantization errors are quantization errors of low orders of the more than one order.*

*8. A non-transitory computer-readable recording medium having recorded thereon a program for making a computer function as the coding device according to claim 7.*

*9. A decoding device comprising:*

*circuitry configured to:*

*execute first decoding processing in which the circuitry obtains first decoded values by decoding a first code, the first decoded values corresponding to line spectrum pair parameters of more than one order;*

*execute second decoding processing in which the circuitry obtains second decoded values of more than one order by decoding a second code if a minimum value of differentials between adjacent parameters of quantized line spectrum pair parameters of all orders or low orders corresponding to the first code and a lowest-order quantized line spectrum pair parameter is smaller than or equal to a predetermined threshold value Th1'; and*

*execute addition processing in which the circuitry obtains third decoded values corresponding to the line spectrum pair parameters of more than one order by adding the first decoded values and the second decoded values of corresponding orders if the minimum value is smaller than or equal to the predetermined threshold value Th1', wherein*

*orders of the second decoded values are lower than orders of the first decoded values, and*

*as for orders higher than the orders of the second decoded values, the addition processing uses the first decoded values of corresponding orders as the third decoded values without change.*

*10. A non-transitory computer-readable recording medium having recorded thereon a program for making a computer function as the decoding device according to claim 9.*

*11. A coding method, implemented by a coding device that includes circuitry, comprising:*

*a first coding step in which the circuitry obtains a first code by coding line spectrum pair parameters of more than one order; and*

*a second coding step in which the circuitry obtains a second code by coding at least quantization errors of the first coding step when a minimum value of differentials between adjacent parameters of quantized line spectrum pair parameters of all orders or low orders corresponding to the first code and a lowest-order quantized line spectrum pair parameter is smaller than or equal to a predetermined threshold value Th1', wherein*

*the quantization errors are quantization errors of low orders of the more than one order.*

*12. A decoding method, implemented by a decoding device that includes circuitry, comprising:*

*a first decoding step in which the circuitry obtains first decoded values by decoding a first code, the first decoded values corresponding to line spectrum pair parameters of more than one order;*

*a second decoding step in which the circuitry obtains second decoded values of more than one order by decoding a second code when a minimum value of differentials between adjacent parameters of quantized line spectrum pair parameters of all orders or low orders corresponding to the first code and a lowest-order quantized line spectrum pair parameter is smaller than or equal to a predetermined threshold value Th1'; and*

*an addition step in which the circuitry obtains third decoded values corresponding to the line spectrum pair parameters of more than one order by adding the fist decoded values and the second decoded values of corresponding orders when the minimum value is smaller than or equal to the predetermined threshold value Th1', wherein*

*orders of the second decoded values are lower than orders of the first decoded values, and*

*as for orders higher than the orders of the second decoded values, the addition step uses the first decoded values of corresponding orders as the third decoded values without change.*

* * * * *